(12) United States Patent
Daniel et al.

(10) Patent No.: US 10,994,357 B2
(45) Date of Patent: May 4, 2021

(54) SYSTEM AND METHOD FOR CREATING OR MODIFYING A WELDING SEQUENCE

(71) Applicant: LINCOLN GLOBAL, INC., City of Industry, CA (US)

(72) Inventors: Joseph A. Daniel, Sagamore Hills, OH (US); Daniel Fleming, Painesville, OH (US); Judah Henry, Geneva, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 1036 days.

(21) Appl. No.: 13/802,883

(22) Filed: Mar. 14, 2013

(65) Prior Publication Data

US 2014/0263225 A1    Sep. 18, 2014

Related U.S. Application Data

(63) Continuation-in-part of application No. 11/613,652, filed on Dec. 20, 2006, now Pat. No. 9,104,195.

(51) Int. Cl.
| | |
|---|---|
| *B23K 9/12* | (2006.01) |
| *B23K 9/095* | (2006.01) |
| *B23K 9/10* | (2006.01) |
| *B23K 9/173* | (2006.01) |
| *G05B 19/4093* | (2006.01) |

(52) U.S. Cl.
CPC .......... *B23K 9/0953* (2013.01); *B23K 9/1043* (2013.01); *B23K 9/173* (2013.01); *G05B 19/40937* (2013.01); *G05B 2219/36296* (2013.01); *G05B 2219/45135* (2013.01); *Y02P 90/02* (2015.11)

(58) Field of Classification Search
CPC .... B23K 9/095; B23K 9/0953; B23K 9/0956; B23K 9/1043; B23K 9/173; G05B 19/40937; G05B 2219/36296
USPC ................ 219/130.01, 130.1, 130.5, 130.51; 228/102; 2/8.2
See application file for complete search history.

(56) References Cited

U.S. PATENT DOCUMENTS

| | | |
|---|---|---|
| 3,581,051 A | 5/1971 | Brown et al. |
| 3,689,734 A | 9/1972 | Burley et al. |

(Continued)

FOREIGN PATENT DOCUMENTS

| | | |
|---|---|---|
| CH | 688034 | 1/1993 |
| CN | 1370654 A | 9/2002 |

(Continued)

OTHER PUBLICATIONS

Japanese to English machine translation of JP 2010075954.*

(Continued)

*Primary Examiner* — Hung D Nguyen
(74) *Attorney, Agent, or Firm* — Calfee, Halter & Griswold LLP

(57) ABSTRACT

The invention described herein generally pertains to a system and method for welder system that relates to creating a welding sequence for a welding environment in which the welding sequence is based upon real time data collected from a performed or previously performed welding procedure. Welding procedure information is collected and utilized to create a welding sequence to perform two or more welds in which at least one parameter is based on the collected welding procedure information (e.g., real world welding procedure).

20 Claims, 12 Drawing Sheets

(56) References Cited

U.S. PATENT DOCUMENTS

| | | |
|---|---|---|
| 3,847,584 A | 11/1974 | Houser |
| 4,104,724 A | 8/1978 | Dix et al. |
| 4,145,593 A | 3/1979 | Merrick et al. |
| 4,324,973 A | 4/1982 | Kirwan et al. |
| 4,380,696 A | 4/1983 | Masaki |
| 4,390,954 A | 6/1983 | Manning |
| 4,419,560 A | 12/1983 | Zurek |
| 4,419,562 A | 12/1983 | Jon et al. |
| 4,459,457 A | 7/1984 | Jurek |
| 4,477,713 A | 10/1984 | Cook et al. |
| 4,497,019 A | 1/1985 | Waber |
| 4,527,045 A | 7/1985 | Nakajima |
| 4,681,999 A | 7/1987 | Hruska |
| 4,785,159 A | 11/1988 | Hruska |
| 4,881,678 A | 11/1989 | Gaudin |
| 4,920,248 A | 4/1990 | Toyoda et al. |
| 5,081,338 A | 1/1992 | Dufrenne |
| 5,206,474 A | 4/1993 | Fukuoka |
| 5,265,787 A | 11/1993 | Ishizaka et al. |
| 5,278,390 A | 1/1994 | Blankenship |
| 5,380,978 A | 1/1995 | Pryor |
| 5,493,093 A | 2/1996 | Cecil |
| 5,532,452 A | 7/1996 | Lechner |
| 5,651,903 A | 7/1997 | Shirk |
| 5,708,253 A | 1/1998 | Bloch et al. |
| 5,773,779 A | 6/1998 | Morlock |
| 5,859,847 A | 1/1999 | Dew et al. |
| 5,866,866 A | 2/1999 | Shimada |
| 5,877,468 A | 3/1999 | Morlock |
| 5,906,761 A | 5/1999 | Gilliland |
| 5,910,894 A | 6/1999 | Pryor |
| 6,023,044 A | 2/2000 | Kosaka et al. |
| 6,063,458 A | 5/2000 | Robertson et al. |
| 6,087,627 A | 7/2000 | Kramer |
| 6,115,273 A | 9/2000 | Geisler |
| RE36,926 E | 10/2000 | Austin |
| 6,133,545 A | 10/2000 | Okazaki et al. |
| 6,151,640 A | 11/2000 | Buda et al. |
| 6,236,017 B1 | 5/2001 | Smartt et al. |
| 6,278,074 B1 | 9/2001 | Molock et al. |
| 6,292,715 B1 | 9/2001 | Hsu |
| 6,399,912 B1 | 6/2002 | Steenis et al. |
| 6,444,942 B1 | 9/2002 | Kawai et al. |
| 6,492,618 B1 | 12/2002 | Flood et al. |
| 6,548,783 B1 | 4/2003 | Kilovsky et al. |
| 6,583,386 B1* | 6/2003 | Ivkovich ............ B23K 9/0953 219/125.1 |
| 6,624,388 B1 | 9/2003 | Blankenship et al. |
| 6,636,776 B1 | 10/2003 | Barton et al. |
| 6,700,097 B1 | 3/2004 | Hsu et al. |
| 6,708,385 B1 | 3/2004 | Lemelson |
| 6,710,298 B2 | 3/2004 | Eriksson |
| 6,717,108 B2 | 4/2004 | Hsu |
| 6,734,394 B2 | 5/2004 | Hsu |
| 6,747,247 B2 | 6/2004 | Holverson |
| 6,822,195 B2 | 11/2004 | Kanodia et al. |
| 6,847,922 B1 | 1/2005 | Wampler, II |
| 6,847,956 B2 | 1/2005 | Manicke et al. |
| 6,912,447 B2 | 6/2005 | Klimko et al. |
| 6,924,459 B2 | 8/2005 | Spear et al. |
| 6,930,280 B2 | 8/2005 | Zauner et al. |
| 7,028,882 B2 | 4/2006 | Kilovsky et al. |
| 7,030,334 B1 | 4/2006 | Ruiz et al. |
| 7,032,814 B2 | 4/2006 | Blankenship |
| 7,072,774 B1 | 7/2006 | Houston |
| 7,102,098 B2 | 9/2006 | Rouault et al. |
| 7,358,458 B2 | 4/2008 | Daniel |
| 7,523,069 B1 | 4/2009 | Friedl |
| 7,539,603 B2 | 5/2009 | Subrahmanyam |
| 7,603,191 B2 | 10/2009 | Gross |
| 7,617,017 B2 | 11/2009 | Menassa et al. |
| 7,642,486 B2 | 1/2010 | Fosbinde et al. |
| 7,772,524 B2 | 8/2010 | Hillen et al. |
| 7,809,534 B2 | 10/2010 | Sturrock |
| 8,049,139 B2 | 11/2011 | Houston |
| 8,115,138 B2 | 2/2012 | Jacovetty et al. |
| 8,224,881 B1 | 7/2012 | Spear |
| 8,322,591 B2 | 12/2012 | Diez et al. |
| 8,592,723 B2 | 11/2013 | Davidson et al. |
| 8,884,177 B2 | 11/2014 | Daniel et al. |
| 9,089,921 B2 | 7/2015 | Daniel et al. |
| 9,104,195 B2 | 8/2015 | Daniel et al. |
| 9,937,577 B2 | 4/2018 | Daniel et al. |
| 2002/0117487 A1 | 8/2002 | Corby, Jr. et al. |
| 2004/0122550 A1* | 6/2004 | Klimko ............ B23K 31/02 700/212 |
| 2004/0232128 A1 | 11/2004 | Niedereder et al. |
| 2004/0245227 A1 | 12/2004 | Grafton-Reed et al. |
| 2005/0127052 A1 | 6/2005 | Spencer |
| 2005/0149210 A1 | 7/2005 | Britton |
| 2006/0070987 A1 | 4/2006 | Daniel |
| 2006/0131291 A1* | 6/2006 | Kaufman ............ B23K 9/09 219/130.5 |
| 2006/0178778 A1 | 8/2006 | Fuhlbrigge et al. |
| 2006/0207980 A1 | 9/2006 | Jacovetty et al. |
| 2006/0231539 A1 | 10/2006 | Katiyar |
| 2007/0056942 A1* | 3/2007 | Daniel ............ B23K 10/006 219/125.1 |
| 2007/0080153 A1 | 4/2007 | Albrecht |
| 2007/0198105 A1 | 8/2007 | Britton |
| 2007/0262065 A1 | 11/2007 | Peters et al. |
| 2008/0149686 A1 | 6/2008 | Daniel et al. |
| 2008/0158502 A1 | 7/2008 | Becker |
| 2008/0169277 A1 | 7/2008 | Achtner et al. |
| 2009/0094721 A1 | 4/2009 | Becker |
| 2009/0107969 A1* | 4/2009 | Asai ............ B23K 9/0216 219/124.1 |
| 2009/0173726 A1* | 7/2009 | Davidson ............ B23K 9/0956 219/130.01 |
| 2009/0277893 A1 | 11/2009 | Spellman |
| 2009/0298024 A1 | 12/2009 | Batzler |
| 2009/0313549 A1* | 12/2009 | Casner ............ B23K 9/0953 715/740 |
| 2010/0012625 A1 | 1/2010 | Silk et al. |
| 2010/0062405 A1 | 3/2010 | Zboray |
| 2010/0176106 A1 | 7/2010 | Christensen |
| 2010/0217440 A1* | 8/2010 | Lindell ............ G05B 19/4183 700/275 |
| 2010/0262468 A1 | 10/2010 | Blankenship |
| 2011/0083241 A1 | 4/2011 | Cole |
| 2011/0120978 A1 | 5/2011 | Takahashi et al. |
| 2011/0172796 A1 | 7/2011 | Sohmshetty et al. |
| 2011/0198329 A1 | 8/2011 | Davidson et al. |
| 2011/0246395 A1 | 10/2011 | Dolson et al. |
| 2011/0255259 A1 | 10/2011 | Weber |
| 2011/0290765 A1 | 12/2011 | Albrecht et al. |
| 2012/0095941 A1 | 4/2012 | Dolson et al. |
| 2012/0122062 A1 | 5/2012 | Yang |
| 2012/0145689 A1 | 6/2012 | Hillen |
| 2012/0325792 A1 | 12/2012 | Stein et al. |
| 2013/0008003 A1 | 1/2013 | Izutani et al. |
| 2013/0015169 A1 | 1/2013 | Marschke et al. |
| 2013/0075380 A1 | 1/2013 | Marschke et al. |
| 2013/0119037 A1 | 5/2013 | Daniel |
| 2013/0264319 A1 | 10/2013 | Temby |
| 2013/0277344 A1 | 10/2013 | Guymon |
| 2013/0282182 A1 | 10/2013 | Hideg |
| 2014/0021184 A1 | 1/2014 | Daniel |
| 2014/0027422 A1 | 1/2014 | Panelli |
| 2014/0042135 A1 | 2/2014 | Daniel et al. |
| 2014/0042136 A1 | 2/2014 | Daniel et al. |
| 2014/0042137 A1 | 2/2014 | Daniel et al. |
| 2014/0263225 A1 | 9/2014 | Daniel et al. |
| 2014/0263226 A1 | 9/2014 | Daniel et al. |
| 2016/0361774 A9 | 12/2016 | Daniel et al. |

FOREIGN PATENT DOCUMENTS

| | | |
|---|---|---|
| CN | 1469791 A | 1/2004 |
| CN | 101600532 A | 12/2009 |
| CN | 20219978 U | 4/2012 |
| CN | 102573720 A | 7/2012 |
| CN | 102596476 A | 7/2012 |

(56) References Cited

FOREIGN PATENT DOCUMENTS

| | | | |
|---|---|---|---|
| CN | 105209994 | A | 12/2015 |
| CN | 105229545 | | 1/2016 |
| CN | 106270941 | A | 1/2017 |
| EP | 1078707 | | 2/2001 |
| EP | 1170649 | | 1/2002 |
| EP | 1700667 | | 9/2006 |
| EP | 1750185 | | 2/2007 |
| JP | 2010075954 | A * | 4/2010 |
| WO | 2002086656 | | 10/2002 |
| WO | 2005084867 | | 9/2005 |
| WO | 2007009131 | A1 | 1/2007 |
| WO | 2008031052 | | 3/2008 |
| WO | 2008079165 | A1 | 7/2008 |
| WO | 2010142858 | | 12/2010 |
| WO | 2011058433 | A1 | 5/2011 |
| WO | 2011100214 | A1 | 8/2011 |
| WO | 2012004491 | | 1/2012 |
| WO | 2013160745 | A1 | 10/2013 |
| WO | 2014140738 | A2 | 9/2014 |
| WO | 2014140743 | A1 | 9/2014 |
| WO | 2014140746 | A2 | 9/2014 |
| WO | 2014140747 | A2 | 9/2014 |
| WO | 2014140749 | A1 | 9/2014 |
| WO | 2014140766 | A1 | 9/2014 |

OTHER PUBLICATIONS

Applicant Initiated Interview Summary from U.S. Appl. No. 13/802,985 dated Oct. 17, 2016.
Amendment from U.S. Appl. No. 13/802,985 dated Oct. 26, 2016.
Office Action from US. Appl. No. 13/803,032 dated Aug. 11, 2016.
Applicant Initiated Interview Summary from U.S. Appl. No. 13/803,032 dated Nov. 2, 2016.
Final Office Action from U.S. Appl. No. 13/803,077 dated Sep. 29, 2016.
International Search Report and Written Opinion from PCT/IB2014/000350 dated Sep. 4, 2014.
International Preliminary Report on Patentability from PCT/IB2014/000350 dated Sep. 15, 2015.
Office Action from U.S. Appl. No. 13/802,985 dated Nov. 3, 2017.
Final Office Action from U.S. Appl. No. 13/803,032 dated Oct. 5, 2017.
Office Action from U.S. Appl. No. 14/730,991 dated Sep. 26, 2017.
Office Action from Chinese Patent Application No. 201480026618.3 dated Mar. 17, 2017 (English translation not available).
Office Action from Chinese Patent Application No. 201480027935 dated Mar. 23, 2017.
Office Action from Chinese Application No. 201480027966.2 dated Mar. 1, 2017.
Non-Final Office Action from U.S. Appl. No. 13/803,032 dated Feb. 24, 2017.
Final Office Action from U.S. Appl. No. 13/803,077 dated Feb. 23, 2017.
Response to Office Action from U.S. Appl. No. 13/802,918 dated May 9, 2017.
Amendment After Final Office Action from U.S. Appl. No. 13/803,077 dated May 22, 2017.
Office Action from U.S. Appl. No. 13/802,918 dated Dec. 16, 2016.
Amendment from U.S. Appl. No. 13/803,077 dated Dec. 29, 2016.
Advisory Action from U.S. Appl. No. 13/803,077 dated Jan. 27, 2017.
Amendment from U.S. Appl. No. 13/803,077 dated Jan. 30, 2017.
Office Action from Chinese Application No. 201480027966.2 dated Aug. 28, 2017.
Final Office Action from U.S. Appl. No. 13/802,918 dated Sep. 8, 2017.
Advisory Action from U.S. Appl. No. 13/802,985 dated Jun. 29, 2017.
Amendment from U.S. Appl. No. 13/802,985 dated Jul. 6, 2017.

Office Action from Chinese Application No. 201610806381.1 dated Aug. 1, 2017 (English Translation).
Task Level Off-line Programming System for Robotic Arc Welding—An Overview; 8287 Journal of Manufacturing Systems, 7 (1988) No. 4, Dearborn, Michigan USA; Jacob Rubinovitz and Richard A. Wysk; pp. 293-305.
PCT/IB2014/000326 International Search Report and Written Opinion of the International Searching Authority dated Aug. 29, 2014.
Response to Restriction Requirement from U.S. Appl. No. 131802,985 dated Mar. 11, 2016.
Notice of Non-Compliant Amendment from U.S. Appl. No. 13/802,985 dated Apr. 13, 2016.
Amendment from U.S. Appl. No. 13/802,985 dated Jun. 2, 2016.
Office Action from U.S. Appl. No. 13/802,985 dated Jul. 26, 2016.
Amendment from U.S. Appl. No. 13/803,032 dated May 4, 2016.
Office Action from U.S. Appl. No. 13/803,077 dated Apr. 21, 2016.
Amendment from U.S. Appl. No. 13/802,918 dated Mar. 8, 2018.
Advisory Action from U.S. Appl. No. 13/802,918 dated Mar. 13, 2018.
Office Action from Chinese Application No. 201480049376.X dated Jan. 2, 2018.
Advisory Action from U.S. Appl. No. 13/803,032 dated Apr. 10, 2018.
Amendment from U.S. Appl. No. 13/803,032 dated Mar. 5, 2018.
Amendment from U.S. Appl. No. 13/802,985 dated May 2, 2018.
Applicant Initiated Interview Summary from U.S. Appl. No. 13/802,985 dated May 3, 2018.
Amendment Filed with RCE from U.S. Appl. No. 13/803,032 dated Apr. 4, 2018.
Second Office Action from Chinese Application No. 201480027580.1 dated Jan. 3, 2018 (English Translation).
Notice of Allowance from U.S. Appl. No. 13/802,951 dated Dec. 7, 2017.
Amendment from U.S. Appl. No. 13/803,077 dated Dec. 6, 2017.
Amendment from U.S. Appl. No. 14/730,991 dated Jan. 26, 2018.
Applicant Initiated Interview Summary from U.S. Appl. No. 13/803,077 dated Dec. 15, 2017.
International Preliminary Report on Patenability from PCT/US15/001991 dated May 26, 2017.
Office Action from U.S. Appl. No. 13/802,985 dated Feb. 8, 2017.
Response to Office Action from U.S. Appl. No. 13/802,985 dated Jun. 8, 2017.
Amendment from U.S. Appl. No. 13/803,032 dated Dec. 7, 2016.
Amendment from U.S. Appl. No. 13/803,032 dated Jun. 20, 2017.
Advisory Action from U.S. Appl. No. 13/803,077 dated Jun. 15, 2017.
Amendment from U.S. Appl. No. 13/803,077 dated Jun. 20, 2017.
Office Action from U.S. Appl. No. 13/803,077 dated Aug. 7, 2017.
Office Action from Chinese Application No. 201480026559.X dated Apr. 27, 2017.
Office Action from Australian Patent Application No. 2007338858 dated Aug. 13, 2010.
Office Action from Canadian Patent Application No. 2672717 dated Mar. 21, 2013 (3 pages).
Office Action from Canadian Patent Application No. 2672717 dated Sep. 2, 2010 (5 pages).
Office Action from Chinese Patent Application No. 200780046777.X dated Jul. 3, 2012 (4 pages).
Office Action from Chinese Patent Application No. 200780046777.X dated Jul. 30, 2013 (4 pages).
Office Action from Chinese Patent Application No. 200780046777.X dated Feb. 1, 2013 (5 pages).
Office Action from Chinese Patent Application No. 200780046777.X dated Jan. 15, 2014 (5 pages).
Office Action from Chinese Patent Application No. 200780046777.X dated Aug. 14, 2014 (8 pages).
Office Action from Chinese Patent Application No. 200780046777.X dated Jul. 20, 2011 (8 pages).
IFW of (related by subject matter) U.S. Appl. No. 11/227,349 filed Sep. 15, 2015.
International Search Report and Written Opinion from PCT/US07/15014 dated Mar. 11, 2008.

(56) References Cited

OTHER PUBLICATIONS

International Preliminary Report on Patenability from PCT/US07/15014 dated Jun. 6, 2009.
International Search Report and Written Opinion from PCT/IB2014/000313 dated Sep. 10, 2014.
International Search Report and Written Opinion from PCT/IB2014/000319 dated Aug. 29, 2014.
International Search Report and Written Opinion from PCT/IB2014/000323 dated Sep. 19, 2014.
International Search Report and Written Opinion from PCT/IB2014/000324 dated Sep. 8, 2014.
Lincoln Welders NA-3 and NA-4, Automatic Welding Systems with Solid State Controls, brochure.
Power Feed 10M, Publication E8.266, Aug. 2004 brochure.
Power Wave 455 M & Power Wave 455 M/Sti, Publication E5.161, Aug. 2004, brochure.
NA-5 Automatic Wedling System, brochure.
Wave Designer, Software for Waveform Control Technology, brochure.
"Interim Guidance for Determining Subject Matter Eligibility for Process Claims in View of *Bilski* v. *Kappos*," 75 Fed. Reg. 43,922-43,928 (Jul. 27, 2010), 7 pages.
Echtler et al., "The Intelligent Welding Gun: Augmented Reality for Experimental Vehicle Construction;" In: Virtual and Augmented Reality Applications in Manufacturing; Ong. S.K. and Nee A.Y.C. eds. Springer Verlag 2001 28 pgs., Jan. 1, 2003.
Office Action from U.S. Appl. No. 11/613,652 dated Aug. 21, 2008.
Amendment from from U.S. Appl. No. 11/613,652 dated Nov. 20, 2008.
Office Action from U.S. Appl. No. 11/613,652 dated Jun. 9, 2009.
Amendment from from U.S. Appl. No. 11/613,652 dated Sep. 9, 2009.
Office Action from U.S. Appl. No. 11/613,652 dated Jan. 25, 2010.
Amendment from from U.S. Appl. No. 11/613,652 dated Jun. 11, 2010.
Office Action from U.S. Appl. No. 11/613,652 dated Aug. 17, 2011.
Amendment from from U.S. Appl. No. 11/613,652 dated Dec. 19, 2011.
Office Action from U.S. Appl. No. 11/613,652 dated Feb. 20, 2014.
Amendment from from U.S. Appl. No. 11/613,652 dated May 19, 2014.
Advisory Action from U.S. Appl. No. 11/613,652 dated Jun. 6, 2014.
Notice of Appeal from U.S. Appl. No. 11/613,652 dated Aug. 19, 2014.
Applicant Summary of Interview With Examiner from U.S. Appl. No. 11/613,652 dated Aug. 19, 2014.
Applicant Summary of Interview With Examiner from U.S. Appl. No. 11/613,652 dated Oct. 2, 2014.
Applicant Initiated Interview Summary from U.S. Appl. No. 11/613,652 dated Oct. 9, 2014.
Amendment from from U.S. Appl. No. 11/613,652 dated Oct. 27, 2014.
Notice of Allowance from from U.S. Appl. No. 11/613,652 dated Nov. 20, 2014.
Restriction Requirement from U.S. Appl. No. 13/802,918 dated Jan. 14, 2016.
Office Action from U.S. Appl. No. 13/802,951 dated Nov. 2, 2015.
Amendment from U.S. Appl. No. 13/802,951 dated Mar. 2, 2016.
Restriction Requirement from U.S. Appl. No. 13/802,985 dated Jan. 15, 2016.
Office Action from U.S. Appl. No. 13/803,032 dated Jan. 5, 2016.
Restriction Requirement from U.S. Appl. No. 13/803,077 dated Jan. 14, 2016.
Response to Restriction Requirement from U.S. Appl. No. 13/802,918 dated Mar. 11, 2016.
Response to Restriction Requirement from U.S. Appl. No. 13/803,077 dated Mar. 11, 2016.
Office Action from Chinese Patent Application No. 201480026618.3 dated Jun. 27, 2018.
Office Action from U.S. Appl. No. 13/803,077 dated May 15, 2018.
Office Action from U.S. Appl. No. 14/730,991 dated May 24, 2018.
Office Action from Chinese Patent Application No. 201480027935.7 dated May 11, 2018.
Fourth Office Action from Chinese Application No. 201480027580.1 dated Apr. 15, 2019.
Office Action from U.S. Appl. No. 13/802,985 dated Apr. 1, 2019.
Applicant Interview Summary from U.S. Appl. No. 13/803,032 dated Feb. 28, 2019.
Office Action from U.S. Appl. No. 13/802,918 dated Mar. 20, 2019.
Notice of Allowance with Examiner Initiated Interview Summary from U.S. Appl. No. 14/730,991 dated Apr. 4, 2019.
What is Implementation—definition from whatis.com downloaded Feb. 22, 2019 (5 pages).
Microcontroller—https:/en.wikipedia/microcontroller—downloaded Feb. 22, 2019 (11 pages).
Office Action from U.S. Appl. No. 13/803,032 dated May 30, 2019.
Amendment from U.S. Appl. No. 13/802,918 dated Jun. 19, 2019.
Notice of Appeal from U.S. Appl. No. 13/802,918 dated Jun. 20, 2019.
Appeal Brief from U.S. Appl. No. 13/802,918 dated Aug. 20, 2019.
Notice of Allowance from U.S. Appl. No. 14/730,991 dated Jul. 10, 2019.
Office Action from Chinese Application No. 201480027966.2 dated Mar. 8, 2018 (5 pages).
Supplemental Response from U.S. Appl. No. 13/802,918 dated Aug. 29, 2018.
Office Action from U.S. Appl. No. 13/802,918 dated Sep. 7, 2018.
Office Action from U.S. Appl. No. 13/802,985 dated Sep. 20, 2018.
Amendment from U.S. Appl. No. 13/802,985 dated Dec. 19, 2018.
Applicant Initiated Interview Summary from U.S. Appl. No. 13/802,985 dated Dec. 31, 2018.
Amendment Filed with RCE from U.S. Appl. No. 13/803,032 dated Oct. 4, 2018.
Office Action from U.S. Appl. No. 13/803,032 dated Oct. 30, 2018.
Amendment from U.S. Appl. No. 13/803,032 dated Jan. 30, 2019.
Response to Office Action from U.S. Appl. No. 13/803,077 dated Aug. 15, 2018.
Advisory Action, Applicant Initiated Interview Summary and After Final Consideration Program Decision from U.S. Appl. No. 13/803,077 dated Sep. 17, 2018.
Applicant Statement of Substance of Interview from U.S. Appl. No. 13/803,077 dated Oct. 17, 2018.
Amendment from U.S. Appl. No. 14/730,991 dated Aug. 21, 2018.
Advisory Action from U.S. Appl. No. 14/730,991 dated Sep. 27, 2018.
Notice of Appeal from U.S. Appl. No. 14/730,991 dated Oct. 23, 2018.
Preliminary Amendment from U.S. Appl. No. 16/131,827 dated Dec. 4, 2018.
Receive—definition from Dictionary.com downloaded Oct. 21, 2018.
Amendment from U.S. Appl. No. 13/802,918 dated Dec. 7, 2018.
Office Action from Korean Application No. 10-2014-7030446 with English Translation dated Nov. 29, 2018.
Response to Office Action from U.S. Appl. No. 13/802,918 dated Sep. 11, 2020.
Office Action from U.S. Appl. No. 15/948,357 dated Jul. 28, 2020.
Amendment from U.S. Appl. No. 15/948,357 dated Oct. 20, 2020.
First Office Action from Chinese Application No. 201910567340.5 dated Sep. 30, 2020 with English Translation.
Notice of Allowance from U.S. Appl. No. 15/948,357 dated Nov. 2, 2020.
Office Action from U.S. Appl. No. 16/131,827 dated Nov. 16, 2020.
Notice of Allowance from U.S. Appl. No. 13/802,918 dated Dec. 18, 2020.
Notice of Allowance from U.S. Appl. No. 13/803,032 dated Mar. 23, 2021.
Response to Office Action from U.S. Appl. No. 16/131,827 dated Feb. 5, 2021.

\* cited by examiner

SYSTEM AND METHOD FOR CREATING OR MODIFYING A WELDING SEQUENCE

CROSS-REFERENCE TO RELATED APPLICATIONS

This application is a continuation-in-part of U.S. application Ser. No. 11/613,652, filed Dec. 20, 2006, and entitled "WELDING JOB SEQUENCER." The entirety of the aforementioned application is incorporated herein by reference.

TECHNICAL FIELD

Devices, systems, and methods consistent with the invention relate to welding work cells.

BACKGROUND OF THE INVENTION

In the related art, work cells are used to produce welds or welded parts. There are at least two broad categories of work cells, including robotic work cells and semi-automatic work cells.

In robotic work cells, the scheduling and performing of welding operations is largely automated, with little operator involvement. Thus, these cells generally have a relatively low labor cost and a relatively high productivity. However, their repeating operations cannot easily adapt to varying welding conditions and/or sequences.

In contrast, semi-automatic work cells (i.e., work cells involving at least some operator welding) generally provide less automation vis-à-vis robotic work cells, and accordingly have a relatively higher labor cost and a relatively lower productivity. Nevertheless, there are many instances where using a semi-automatic welding work cell can actually be advantageous over robotic work cells. For example, a semi-automatic welding work cell can more easily adapt to varying welding conditions and/or sequences.

Unfortunately, when welding more complex assemblies in related art semi-automatic work cells, multiple different welding schedules are often required for different types of welds on different parts of an assembly. In many systems, when a different welding schedule must be utilized, the operator is required to stop welding operations and manually adjust the output of the semi-automatic equipment according to the new schedule. In some other systems, this manual adjustment is eliminated by storing particular schedules in the work cell. Nevertheless, even in such systems, the operator still needs to cease welding operations and push a button to select the new welding schedule before he may continue welding.

Neither of these practices for setting a different welding schedule is particularly efficient. Thus, in practice, the number of welding schedules used in a semi-automatic work cell is often reduced in order to eliminate the need for constant adjustment of the output of the semi-automatic equipment. While this reduction of welding schedules makes the overall operation easier for the welder, the forced simplification of this approach can lead to reduced productivity and lower overall quality.

Additionally, when abiding by strict quality control specifications, it is sometimes necessary to perform welds in a specific sequence, verify that each weld is performed with a given set of conditions, and monitor the output of the equipment during the welding operations. In a robotic work cell, these requirements are easily fulfilled. However, in a semi-automatic work cell, these requirements are susceptible to human error, since the operator must keep track of all of these aspects in addition to performing the welding operations themselves.

An illustrative example of the above problems is shown in the related art semi-automatic welding method diagrammatically represented in FIG. 1. In this method, each of the various scheduling, sequencing, inspection and welding operations are organized and performed by the operator (i.e., the welder) himself. Specifically, the operator begins the welding job at operation 10. Then, the operator sets up the welding equipment according to schedule A, at operation 20. Next, the operator performs weld #1, weld #2, and weld #3 using welding schedule A at operations 22, 24 and 26. Then, the operator stops welding operations and sets up the welding equipment according to schedule B at operation 30. Next, the operator performs weld #4 using welding schedule B at operation 32. Then, the operator checks the dimensions of the assembly at operation 40, and sets up the welding equipment according to schedule C at operation 50. Next, the operator performs weld #5 and weld #6 using welding schedule C at operations 52 and 54. After the welding operations are completed, the operator visually inspects the welded assembly at operation 60, and completes the welding job at operation 70.

Clearly, the method shown in FIG. 1 depends on the operator to correctly follow the predefined sequencing for performing welds and inspections, to accurately change between welding schedules (such as at operation 30), and to perform the welding itself. Errors in any of these responsibilities can result either in rework (if the errors are caught during inspection at operation 60) or a defective part being supplied to the end user. Further, this exemplary semi-automatic welding method hampers productivity, because the operator must spend time configuring and reconfiguring weld schedules.

The above problems demand an improvement in the related art system.

SUMMARY OF THE INVENTION

In accordance with an embodiment of the present invention, a welding system is provided that includes a first component that is configured to receive a parameter related to a welding schedule, wherein the parameter is collected from at least one of a welding process previously performed or a welding process being performed. Within the embodiment, the welding system further includes a second component that is configured to create a welding sequence for a welding work cell, wherein the welding sequence defines at least the parameter and the welding schedule for a first welding procedure to create a first weld on a workpiece and a second welding procedure to create a second weld on the workpiece. Within the embodiment, the welding system includes a welding job sequencer component that is configured to employ the welding sequence for the welding work cell.

In accordance with an embodiment of the present invention, a method is provided that creates a welding sequence that includes the steps of: receiving a first parameter related to a first welding schedule; receiving a second parameter related to a second welding schedule; creating a welding sequence based on the first parameter and the second parameter, wherein the welding sequence defines a first welding procedure that includes the first parameter to create a first weld on a workpiece and a second welding procedure that includes the second parameter to create a second weld on the workpiece; storing the created welding sequence remote from the welding work cell; and utilizing the welding sequence to automatically modify a welding equipment within the welding work cell without intervention from an operator creating at least one of the first weld or the second weld.

In accordance with an embodiment of the present invention, a welding system is provided that includes means for collecting a parameter from a welding procedure in real time, wherein the parameter relates to a welding schedule; means for creating a welding sequence for a welding work cell, wherein the welding sequence defines at least the parameter and the welding schedule for a first welding procedure to create a first weld on a workpiece and a second welding procedure to create a second weld on the workpiece; and means for employing the welding sequence for the welding work cell to perform one or more welds to assemble the workpiece by automatically adjusting a setting on a welding equipment within the welding work cell.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that relate to creating a welding sequence for a welding environment in which the welding sequence is based upon real time data collected from a performed or previously performed welding procedure. Welding procedure information is collected and utilized to create a welding sequence to perform two or more welds in which at least one parameter is based on the collected welding procedure information (e.g., real world welding procedure). The welding sequence is utilized to automatically configure a welding operation and/or at least one welding equipment to perform two or more welds that include disparate welding schedules (at least a portion of the welding schedules differ). Moreover, the welding sequence can eliminate operator intervention to configure or update welding equipment which allows the operator to concentrate on an act of welding rather than welding equipment settings, configurations, among others.

According to an aspect of the invention, there is provided a semi-automatic welding work cell including a welding job sequencer that automatically selects a welding schedule for use by an operator in the semi-automatic welding work cell.

According to another aspect of the invention, there is provided a method of welding in a semi-automatic work cell, including automatically selecting a welding schedule for use by an operator in the semi-automatic welding work cell.

According to another aspect of the invention, there is provided a welding production line including at least one semi-automatic welding work cell, where the semi-automatic work cell includes a welding job sequencer that automatically selects a welding schedule for use by an operator therein.

According to another aspect of the invention, there is provided a method of monitoring a welding production line, including automatically selecting a welding schedule for use by an operator in a semi-automatic welding work cell.

The term "component" as used herein can be defined as a portion of hardware, a portion of software, or a combination thereof. A portion of hardware can include at least a processor and a portion of memory, wherein the memory includes an instruction to execute.

Figure 1:
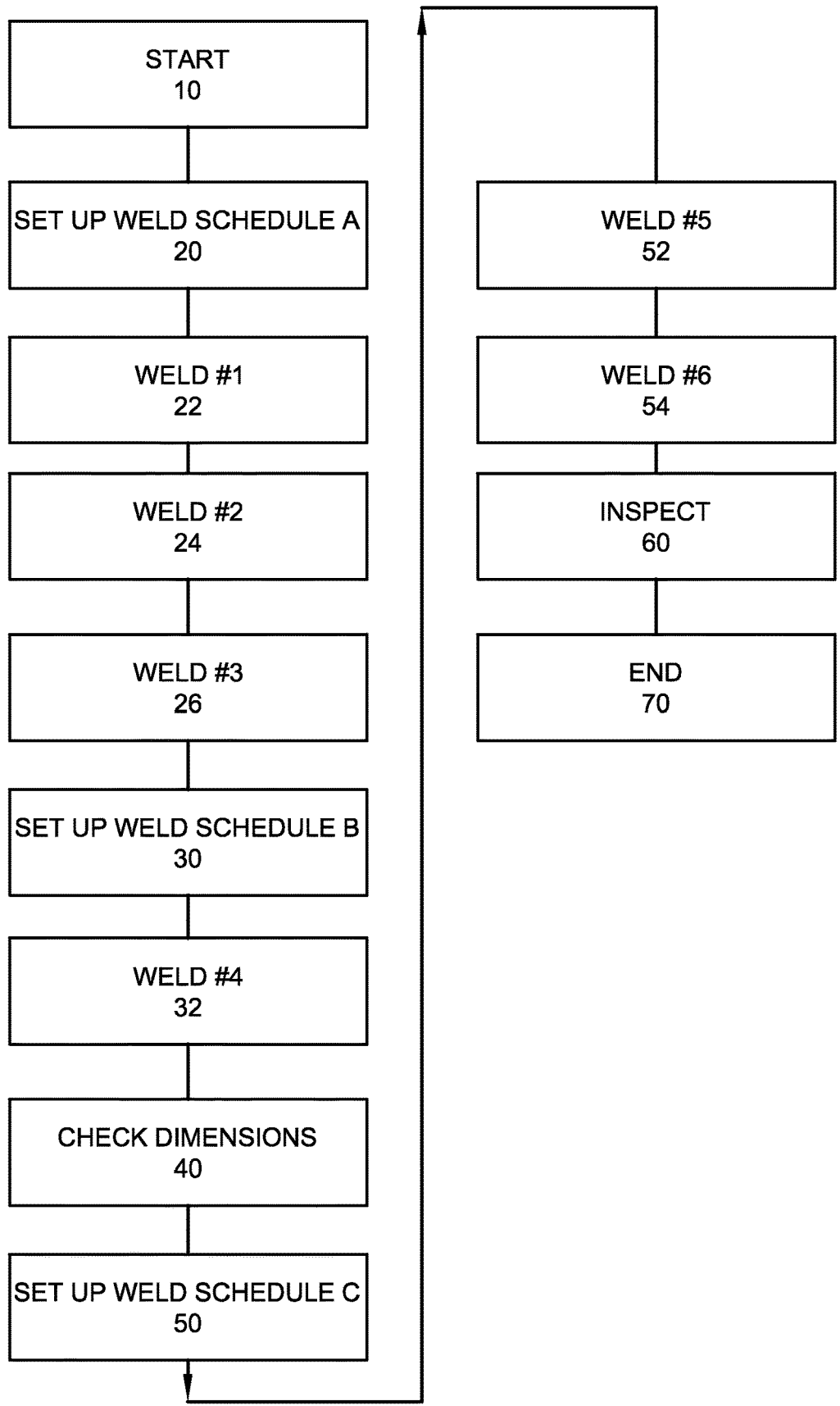
FIG. 1 illustrates a welding operation of the related art utilizing a semi-automatic welding work cell.
Figure 2:
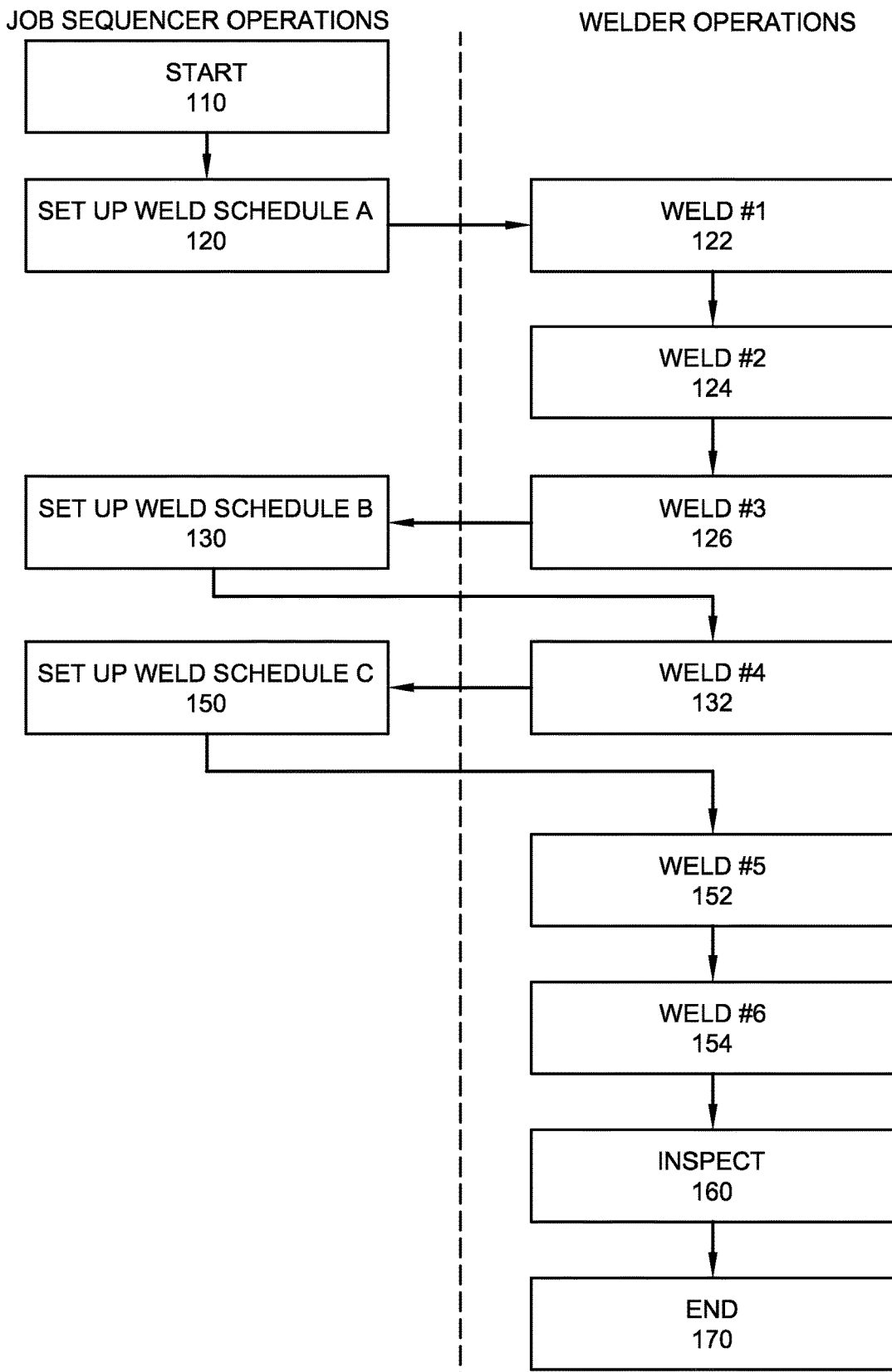
FIG. 2 illustrates a welding operation according to the invention utilizing a semi-automatic welding work cell.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 2 is referenced. In an exemplary embodiment of the invention as illustrated in FIG. 2, a welding job sequencer is provided. The welding job sequencer improves the semi-automatic work cell of the related art by increasing the productivity of the semi-automatic work cell without compromising the number of weld schedules usable therein. The welding job sequencer accomplishes this improvement by implementing automatic changes in the semi-automatic work cell, and by providing the operator with an array of commands and instructions.

More specifically, in an exemplary embodiment, the welding job sequencer automatically selects and implements a function of the welding work cell. An example of such a function includes a particular weld schedule to be used with the semi-automatic work cell. In other words, the welding job sequencer may select a weld schedule to be used for a particular weld, and modify the settings of the semi-automatic work cell in accordance with the selected weld schedule, automatically for the operator (i.e., without the operator's specific intervention).

Additionally, in the exemplary embodiment, the welding job sequencer may automatically indicate a sequence of operations that the operator should follow to create a final welded assembly. In conjunction with the automatic selection of welding schedules, this indicated sequence allows an operator to follow the sequence to create a final welded part, without having to spend time adjusting, selecting, or reviewing each individual weld schedule and/or sequence.

Accordingly, since the welding job sequencer sets up the welding equipment and organizes the workflow, and since the operator only performs the welding operations themselves, the chance for error in the welding operation is greatly reduced, and productivity and quality are improved.

The exemplary embodiment is diagrammatically represented in FIG. 2. In FIG. 2, at operation 110, the welding job sequencer begins operation, and immediately sets the welding equipment to use weld schedule A (operation 120) and instructs the operator to perform welds #1, #2 and #3. Then, the operator performs welds #1, #2 and #3 using weld schedule A (operations 122, 124 and 126). Next, the welding job sequencer sets the welding equipment to use weld schedule B (operation 130), and instructs the operator to perform weld #4. Then the operator performs weld #4 using weld schedule B (operations 132). After completion of weld schedule B, the welding job sequencer sets the welding equipment to use weld schedule C (operation 150), and instructs the operator to perform welds #5 and #6, and to inspect the part. Then, the operator performs welds #5 and #6 (operations 152, and 154) using weld schedule C, and inspects the completed part to confirm that it is correct (operation 160). This inspection may include dimensional verification, visual defect confirmation, or any other type of check that might be needed. Further, operation 160 may include a requirement that the operator affirmatively indicate that the inspection is complete, such as by pressing an "OK" button, before it is possible to proceed to the next operation. Lastly, the welding job sequencer indicates that the welding operation is at an end (operation 170), and re-sets for the next operation.

Accordingly, as noted above, the sequencing and scheduling of welding operations is completed by the sequencer, and frees the operator to focus on performing welds according to instruction.

The welding job sequencer may select and implement a new function, such as the selection and implementation of weld schedules A, B and C shown in FIG. 2, based upon various variables or inputs. For example, the welding job sequencer may simply select new weld schedules based upon a monitoring of elapsed time since the beginning of the welding operations, or since the cessation of welding (such as the time after weld #3 in FIG. 2 above). Alternatively, the welding job sequencer may monitor the actions of the operator, compare the actions to the identified sequence of welds, and select new weld schedules appropriately. Still further, various combinations of these methods, or any other effective method, may be implemented, as long as the end effect is to provide an automatic selection and implementation of a function, such as the weld schedule, for use by the operator.

Parameters of the selected weld schedule may include such variables as welding process, wire type, wire size, WFS, volts, trim, which wire feeder to use, or which feed head to use, but are not limited thereto.

While the above description focuses on the selection of a weld schedule as a function which is automatically selected and implemented, the welding job sequencer is not limited to using only this function.

For example, another possible function that may be selected and implemented by the welding job sequencer is a selection of one of multiple wire feeders on a single power source in accordance with the weld schedule. This function provides an even greater variability in welding jobs capable of being performed by the operator in the semi-automatic work cell, since different wire feeders can provide a great variance of, for example, wire sizes and types.

Another example of a function compatible with the welding job sequencer is a Quality Check function. This function performs a quality check of the weld (either during welding or after the weld is completed) before allowing the job sequence to continue. The quality check can monitor various welding parameters and can pause the welding operation and alert the operator if an abnormality is detected. An example of a welding parameter measurable by this function would be arc data.

Another example of such a function would be a Repeat function. This function would instruct the operator to repeat a particular weld or weld sequence. An example of the use of this function includes when the Quality Check function shows an abnormality, or when multiple instances of the same weld are required.

Another example of such a function would be a Notify Welder function, which communicates information to the welder. This function would display information, give an audible signal, or communicate with the welder by some other means. Examples of use of this function include an indication to the operator that he is free to begin welding, or an indication that the operator should check some portion of the welded part for quality purposes.

Another example of such a function would be a Enter Job Information function. This function will require the welder to enter information, such as the part serial number, a personal ID number, or other special conditions before the job sequencer can continue. This information could also be read from a part or inventory tag itself through Radio Frequency Identification (RFID), bar code scanning, or the like. The welding job sequencer could then utilize the entered information for the welding operations. An example of the use of this function would be as a predicate to the entire welding operation, so as to indicate to the welding job sequencer which schedules and/or sequences should be selected.

A further example of such a function would be a Job Report function. This function will create a report on the welding job, which could include information such as: the number of welds performed, total and individual arc timing, sequence interruptions, errors, faults, wire usage, arc data, and the like. An example of the use of this function would be to report to a manufacturing quality department on the efficiency and quality of the welding processes.

A still further example of such a function would be a System Check function. This function will establish whether the welding job can continue, and could monitor such parameters as: wire supply, gas supply, time left in the shift (as compared to the required time to finish the job), and the like. The function could then determine whether the parameters indicate that there is enough time and/or material for the welding job to continue. This function would prevent down-time due to material depletion, and would prevent work-in-process assemblies from being delayed, which can lead to quality problems due to thermal and scheduling issues.

Further, as mentioned above, the welding job sequencer may select and implement a new function, based upon various variables or inputs. These variables and inputs are not particularly limited, and can even be another function. For example, another function compatible with the welding job sequencer is a Perform Welding Operation function. This function is designed to detect the actual welding performed by the operator, and to report that welding so that the welding job sequencer can determine whether to proceed with further operations. For example, this function can operate by starting when the operator pulls the trigger to start the welding operation, and finishing when the operator releases the trigger after the welding is complete, or after a predetermined period of time after it starts. This function could end when the trigger is released or it could be configured to automatically turn off after a period of time, a quantity of wire, or an amount of energy is delivered. This function may be used to determine when to select a new function, such as a new weld schedule, as discussed above.

Still further, various semi-automatic and/or robotic work cells can be integrated together on a single network, and the sequencing of welding steps at a single work-cell can be fully integrated into a complete production schedule, which itself can be modified as needed to track variations in the production schedule. Sequencing and/or scheduling information can also be stored in a database, be stored by date as archival information, and be accessed to provide various production reports In an embodiment, a semi-automatic welding work cell for welding an assembly defined by a plurality of welds can be provided, the plurality of welds being defined by at least two weld schedules can include welding equipment for use by a welding operator to perform said plurality of welds and complete the assembly with said welding equipment having a plurality of functions. In the embodiment, the work cell can include a welding job sequencer that automatically selects a welding schedule for use by an operator in the semi-automatic welding work cell. In the embodiment, the welding job sequencer can select the welding schedule according to an elapsed time. In an embodiment, the welding job sequencer can detect when the operator is conducting a welding operation, and selects the welding schedule based upon that detection. In the embodiment, the welding job sequencer can detect when the operator is conducting a welding operation, and the welding job sequencer selects the welding schedule according to an amount of welding wire supplied for the welding operation. In the embodiment, the welding job sequencer can detect when the operator is conducting a welding operation, and the welding job sequencer selects the welding schedule according to an amount of energy supplied for the welding operation. In the embodiment, the welding schedule includes information about at least one of a welding process, wire type, wire size, WFS, volts, trim, wire feeder to use, or feed head to use.

In an embodiment, the welding work cell can include the welding job sequencer which select and implements at least one of a plurality of functions to define at least a first weld schedule and a second weld schedule from the at least two weld schedules so as to organize a workflow for creating the welded assembly and indicate to the welding operator a sequence of working operations for completing the assembly. In the embodiment, the welding job sequencer can automatically modify the welding equipment in accordance with the workflow and sequence of the welding operations without the welding operator intervening.

In the embodiment, the second weld schedule is defined according to an elapsed time of the first weld schedule. In the embodiment, the at least one function detects completion of said first weld schedule by said operator and automatically changes from said first weld schedule to said second weld schedule. In the embodiment, at least one function detects when the operator is conducting said first weld schedule, and said second weld schedule is defined according to an amount of welding wire supplied for said first weld schedule. In the embodiment, at least one function detects when the operator is conducting said first weld schedule, and said second weld schedule is defined according to an amount of energy supplied for said first weld schedule. In the embodiment, the at least one first weld set up parameter and said at least one second weld set up parameter comprise at least one of a welding process, wire type, wire size, WFS, volts, trim, wire feeder to use, or feed head to use. In the embodiment, at least one first weld set up parameter and said at least one second weld set up parameter comprise a feeder for use by an operator in the semi-automatic welding work cell. In the embodiment, at least one function monitors quality measurables of said weld assembly, wherein the quality measureables comprise at least information about an arc used to form the weld created by the operator In the embodiment, at least one function indicates information to the operator in the semiautomatic welding work cell. In the embodiment, at least one function accepts job information comprising at least a part ID number, operator ID number, or welding instructions. In the embodiment, at least one function produces a job report comprising at least one of a number of welds preformed, total arc time, individual arc time, sequence interruptions, errors, faults, wire usage, arc data. In the embodiment, at least one function includes a system check of said cell, the system check comprising at least a detection of wire supply, gas supply, and time.

In the embodiment, the welding job sequencer can select a welding sequence for use by the operator in the semi-automatic welding work cell. In the embodiment, the welding job sequencer can indicate the selected welding sequence to the operator in the semi-automatic welding work cell. In the embodiment, the welding job sequencer can select a wire feeder for use by an operator in the semi-automatic welding work cell. In the embodiment, the welding job sequencer can monitor quality measurables of a weld created by the operator, wherein the quality measureables comprise at least information about an arc used to form the weld created by the operator. In the embodiment, the welding job sequencer can indicate information to the operator in the semi-automatic welding work cell. In the embodiment, the welding job sequencer can accept job information comprising at least a part ID number, operator ID number, or welding instructions. In the embodiment, the welding job sequencer can produce a job report comprising at least one of a number of welds preformed, total arc time, individual arc time, sequence interruptions, errors, faults, wire usage, arc data. In the embodiment, the welding job sequencer can perform a system check comprising at least a detection of wire supply, gas supply, and time.

In an embodiment, a method of welding in a semi-automatic work cell can be provided that includes automatically selecting a welding schedule for use by an operator in the semi-automatic welding work cell. In the embodiment, the automatic selection can be performed after an elapsed time. In the embodiment, the method can include detecting when the operator is conducting a welding operation, wherein the automatic selection is performed based upon that detection. In the embodiment, the method can include detecting when the operator is conducting a welding operation, wherein the automatic selection is performed according to an amount of welding wire supplied for the welding operation. In the embodiment, the method can include detecting when the operator is conducting a welding operation, wherein the automatic selection is performed according to an amount of energy supplied for the welding operation. In the embodiment, the welding schedule can include information about at least one of a welding process, wire type, wire size, WFS, volts, trim, wire feeder to use, or feed head to use.

In the embodiment, the method can include selecting a welding sequence for use by the operator in the semi-automatic welding work cell. In the embodiment, the method can include indicating the selected welding sequence to the operator in the semi-automatic welding work cell. In the embodiment, the method can include selecting a wire feeder for use by an operator in the semi-automatic welding work cell. In the embodiment, the method can include monitoring quality measurables of a weld created by the operator, wherein the quality measureables comprise at least information about an arc used to form the weld created by the operator. In the embodiment, the method can include indicating information to the operator in the semi-automatic welding work cell. In the embodiment, the method can include accepting job information comprising at least a part ID number, operator ID number, or welding instructions. In the embodiment, the method can include producing a job report comprising at least one of a number of welds performed, total arc time, individual arc time, sequence interruptions, errors, faults, wire usage, arc data. In the embodiment, the method can include performing a system check comprising at least a detection of wire supply, gas supply, and time.

In an embodiment, a welding production line is provided with at least one semi-automatic welding work cell, wherein the semi-automatic work cell that includes a welding job sequencer that automatically selects a welding schedule for use by an operator therein. In the embodiment, the welding production line includes a monitoring system that communicates with the welding job sequencer to direct the welding job sequencer to automatically select the welding schedule for use by the operator therein.

In an embodiment, a method of monitoring a welding production line is provided that includes automatically selecting a welding schedule for use by an operator in a semi-automatic welding work cell. In the embodiment, the method can include directing the welding job sequencer to automatically select the welding schedule for use by the operator therein.

In an embodiment, a semi-automatic welding work cell is provided that includes a welding job sequencer that automatically selects a welding schedule for use by an operator in the semi-automatic welding work cell. The automatic selection may be by way of elapsed time, a detection of welding operations, a detection of the amount of welding wire supplied for the welding operation, or a detection of the amount of energy supplied for the welding operation.

In an embodiment, a method of welding in a semi-automatic work cell having welding equipment and a welding job sequencer to complete an assembly defined by a plurality of welds can be provided in which the plurality of welds can be defined by at least two weld schedules. The embodiment can include at least the steps of the following: implementing a welding equipment function with the welding job sequencer to define from the at least two weld schedules a first weld schedule having at least one first weld set up parameter and at least one first weld instruction and a second weld schedule having at least one second weld set up parameter and at least one second weld instruction, at least one of the said second weld set up parameter and said second weld instruction is different from said first weld set up parameter and said first weld instruction; indicating to a welding operator a sequence of welding operations for completing the assembly based on said first and second weld schedules; and automatically modifying said welding equipment in accordance with said sequence of welding operations for completing the assembly based on said first and second weld schedules.

In the embodiment, the method can include defining said second weld schedule is performed after an elapsed time defined by said first weld schedule. In the embodiment, the method can include detecting when the operator is conducting said first weld schedule, wherein defining said second schedule is based upon that detection. In the embodiment, defining said first and second weld schedules can include defining an amount of welding wire supplied for the welding operation. In the embodiment, defining said second weld schedule is according to an amount of energy supplied for the welding operation for said first weld schedule. In the embodiment, defining at least one of the first and second weld schedules can include selecting at least one of a welding process, wire type, wire size, WFS, volts, trim, wire feeder to use, or feed bead to use. In an embodiment, defining at least one of the first and second weld schedules can include selecting a wire feeder for use by an operator in the semi-automatic welding work cell. In an embodiment, the method can include monitoring quality measurables of a weld created by the operator, wherein the quality measureables comprise at least information about an arc used to form the weld created by the operator. In an embodiment, the method can include indicating information to the operator in the semi-automatic welding work cell. In an embodiment, the method can include accepting job information comprising at least a part ID number, operator ID number, or welding instructions. In an embodiment, the method can include producing a job report comprising at least one of a number of welds performed, total arc time, individual arc time, sequence interruptions, errors, faults, wire usage, arc data performing a system check comprising at least a detection of wire supply, gas supply, and time.

In an embodiment, a welding production line is provided that includes at least one semi-automatic welding work cell for welding an assembly defined by a plurality of welds, the plurality of welds being defined by at least weld schedules, the semi-automatic welding work cell including welding equipment for use by a welding operator to perform the plurality of welds and complete the assembly, the welding equipment having a plurality of functions. In the embodiment, the production line can include a welding job sequencer which selects and implements at least one of the plurality of functions to define at least a first and a second weld schedule in a sequence of welding operations from the at least two weld schedules to be used by said welding operator for completing the weld assembly. In an embodiment, the production line can include said first weld schedule contains at least one first weld set up parameter and at least one first weld instruction for said welding operator and said second weld schedule contains at least one second weld set up parameter and at least one second weld instruction for said welding operator, at least one of said first weld set up parameter and said first weld instruction is different from said second weld set up parameter and said second weld instruction, said welding job sequencer automatically modifying said welding equipment in accordance with said sequence of operations without said welding operator intervention. In an embodiment, the production line can include a monitoring system in communication with the welding job sequencer to monitor completion of the at least one weld instruction of each of the first and second weld schedule.

In an embodiment, a method for monitoring a welding production line in at least one semi-automatic welding work cell for use by a welding operator to complete an assembly defined by a plurality of welds, the plurality of welds being defined by at least two weld schedules, the semi-automatic welding work cell including welding equipment and a welding job sequencer. The method can include at least the following steps: defining at least a first and a second weld schedule in a sequence of welding operations from the at least two weld schedules with the welding job sequencer said first weld schedule having at least one first weld set up parameter and at least one first weld instruction and said second weld schedule defining at least one second weld set up parameter and at least one second weld instruction with at least one of said second weld set up parameter and said second weld instruction being different from said first weld set up parameter and said first weld instruction; determining completion of said first weld schedule by said welding operator; automatically modifying the welding equipment in accordance with said second weld schedule without said welding operator intervention; and monitoring the welding operations. In the embodiment, the method can include automatically modifying the welding equipment in accordance with said second weld schedule is based on said completion of said first weld schedule.

In an embodiment, a semi-automatic welding work cell for use by an operator is provided. The embodiment can include welding equipment having a plurality of functions for performing welds by the operator and a welding job sequencer selecting from the plurality of functions to set up and organize the welding equipment for the operator. The embodiment can include the plurality of functions including: a weld schedule function defined by a sequence of weld operations; a notify function to instruct the operator to perform the weld schedule; and a quality check function to monitor at least one weld operation of the sequence of weld operations.

In the embodiment, the quality check function performs a quality check on a weld completed by the at least one weld operation. In the embodiment, the quality check function monitors the at least one weld operation during the at least one weld operation. In the embodiment, the quality check function monitors the at least one weld operation after completion of the at least one weld operation. In the embodiment, the weld schedule function defines a plurality of weld schedules, each weld schedule having a first weld operation and at least a second weld operation. In the embodiment, the quality check function monitors the at least one weld operation before allowing the sequence of weld operations to continue. In the embodiment, the quality check function detects an abnormality, the sequencer pauses the sequence of weld operations and the notify function alerts the operator of the abnormality.

Figure 3:
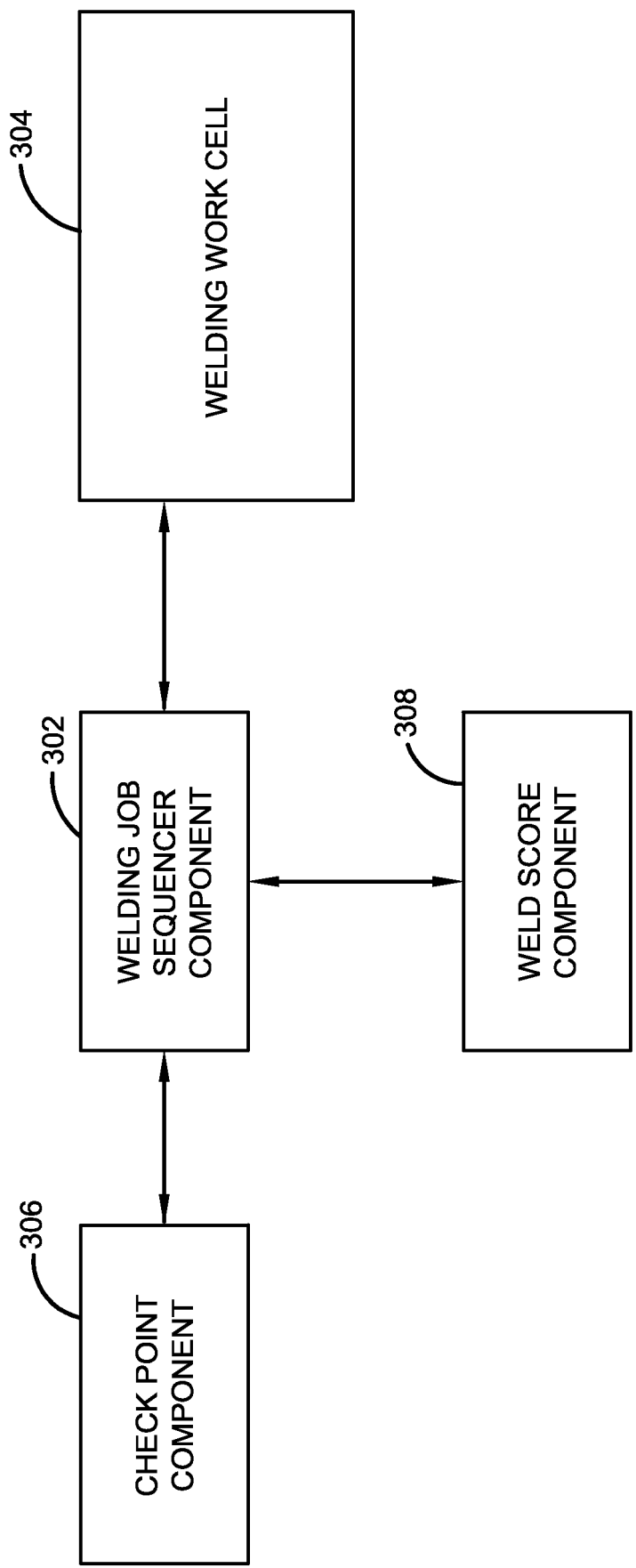
FIG. 3 is a block diagram illustrating a welding system that utilizes a welding job sequencer component to configure welding equipment for two or more weld operations to assembly a workpiece.

FIG. 3 is a schematic block diagram of an exemplary embodiment of welding system 300 that utilizes welding job sequencer component 302 to configure welding equipment for two or more weld operations to assembly a workpiece. Welding job sequencer component 302 is configured to implement a welding sequence that includes settings, configurations, and/or parameters to perform two or more welding procedures on a workpiece. In particular, welding job sequencer component 302, as discussed above as welding job sequencer, automatically configures welding equipment to create two or more welds that include two or more welding schedules. Moreover, welding job sequencer component 302 utilizes the welding sequence to aid an operator to perform the two or more welds. As discussed above, welding job sequencer component 302 can be utilized with welding work cell 304 that is semi-automatic. However, it is to be appreciated and understood that welding job sequencer component 302 can be implemented in a suitable welding environment or system that includes at least welding equipment and an operator to facilitate creating one or more welds.

Welding system 300 further includes check point component 306 that is configured to monitor a welding process and/or a welding operator in real time. For instance, the welding process is monitored in real time to detect at least one of a welding parameter (e.g., voltage, current, among others), a welding schedule parameter (e.g., welding process, wire type, wire size, WFS, volts, trim, wire feeder to use, feed head to use, among others), a weld on a workpiece as the weld is created, a movement of an operator, a position of a welding tool, a position or location of a welding equipment, a position or location of an operator, sensor data (e.g., video camera, image capture, thermal imaging device, heat sensing camera, temperature sensor, among others), and the like. Check point component 306 includes an alert system (not shown) that can communicate an alert or notification to indicate a status of the real time monitoring. In an embodiment, check point component 306 can utilize thresholds, ranges, limits, and the like for the real time monitoring to precisely identify a abnormality with welding system 300. Furthermore, check point component 306 can communicate an alert or notification to welding work cell 304 or the operator to at least one of stop the welding procedure, continue with the welding procedure, pause the welding procedure, terminate the welding procedure, or request approval of the welding procedure. In an embodiment, check point component 306 can store monitoring data (e.g., video, images, results, sensor data, and the like) in at least one of a server, a data store, a cloud, a combination thereof, among others.

Weld score component 308 is included with welding system 300 and is configured to evaluate a weld created by an operator within welding work cell 304 upon completion of such weld. Weld score component 308 provides a rating or score for the completed weld to facilitate implementing a quality control on the workpiece and/or assembly of the workpiece. For instance, weld score component 308 can alert a quality inspection upon completion, provide data collection of a job (e.g., assembly of workpiece, weld on workpiece, among others), and the like. In an embodiment, an in-person quality inspection can be performed upon completion of a portion of the assembly (e.g., completion of a weld, completion of two or more welds, completion of assembly, among others). In another embodiment, weld score component 308 can utilize a sensor to collect data (e.g., video camera, image capture, thermal imaging device, heat sensing camera, temperature sensor, among others) to determine approval of the job. For instance, a quality inspection can be performed remotely via video or image data collected upon completion of a job.

It is to be appreciated that welding job sequencer component 302 can be a stand-alone component (as depicted), incorporated into welding work cell 304, incorporated into check point component 306, incorporated into weld score component 308, or a suitable combination thereof. Additionally, as discussed below, welding job sequencer component 302 can be a distributed system, software-as-a-service (SaaS), a cloud-based system, or a combination thereof. Further, it is to be appreciated and understood that check point component 306 can be a stand-alone component (as depicted), incorporated into welding work cell 304, incorporated into welding job sequencer component 302, incorporated into weld score component 308, or a suitable combination thereof. Additionally, check point component 306 can be a distributed system, software-as-a-service (SaaS), a cloud-based system, or a combination thereof. Moreover, it is to be appreciated and understood that weld score component 308 can be a stand-alone component (as depicted), incorporated into welding work cell 304, incorporated into welding job sequencer component 302, incorporated into check point component 306, or a suitable combination thereof. Additionally, weld score component 308 can be a distributed system, software-as-a-service (SaaS), a cloud-based system, or a combination thereof.

Figure 4:
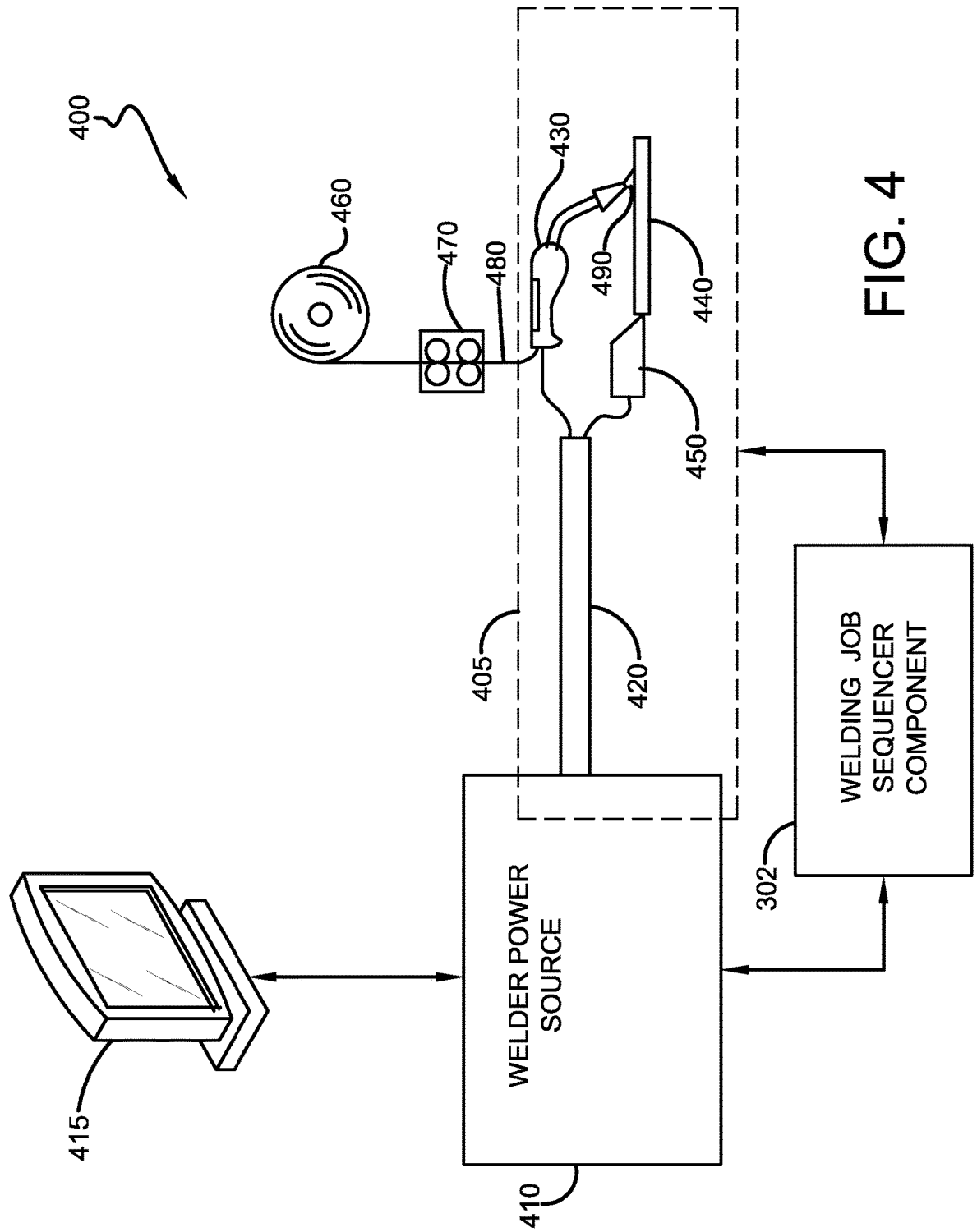
FIG. 4 is a block diagram illustrating a welding system that utilizes a welding job sequencer component.

FIG. 4 illustrates a schematic block diagram of an exemplary embodiment of welding system 400 including welding circuit path 405. It is to be appreciated that welding system 400 is also referred to as the welding work cell, wherein the welding work cell and/or welding system 400 can produce welds or welded parts. Welding system 400 includes welder power source 410 and display 415 operationally connected to welder power source 410. Alternatively, display 415 may be an integral part of welder power source 410. For instance, display 415 can be incorporated into welder power source 410, a stand-alone component (as depicted), or a combination thereof. Welding system 100 further includes welding cable 120, welding tool 430, workpiece connector 450, spool of wire 460, wire feeder 470, wire 480, and workpiece 440. Wire 480 is fed into welding tool 430 from spool 460 via wire feeder 470, in accordance with an embodiment of the present invention. In accordance with another embodiment of the present invention, welding system 400 does not include spool of wire 460, wire feeder 470, or wire 480 but, instead, includes a welding tool comprising a consumable electrode such as used in, for example, stick welding. In accordance with various embodiments of the present invention, welding tool 430 may include at least one of a welding torch, a welding gun, and a welding consumable.

Welding circuit path 405 runs from welder power source 410 through welding cable 420 to welding tool 430, through workpiece 440 and/or to workpiece connector 450, and back through welding cable 420 to welder power source 110. During operation, electrical current runs through welding circuit path 405 as a voltage is applied to welding circuit path 405. In accordance with an exemplary embodiment, welding cable 420 comprises a coaxial cable assembly. In accordance with another embodiment, welding cable 420 comprises a first cable length running from welder power source 410 to welding tool 430, and a second cable length running from workpiece connector 450 to welder power source 410.

Welding system 400 includes welding job sequencer component 302 (as described above). Welding job sequencer component 302 is configured to interact with a portion of welding system 400. For instance, welding job sequencer component 302 can interact with at least the power source 410, a portion of welding circuit path 405, spool of wire 460, wire feeder 470, or a combination thereof. Welding job sequencer component 302 automatically adjusts one or more elements of welding system 400 based on a welding sequence, wherein the welding sequence is utilized to configure welding system 400 (or an element thereof) without operator intervention in order to perform two or more welding procedures with respective settings or configurations for each welding procedure.

In an embodiment, welding job sequencer component 302 employs a welding sequence to automatically configure welding equipment. It is to be appreciated that welding system 400 or welding work cell can employ a plurality of welding sequences for assembly of one or more workpieces. For instance, a workpiece can include three (3) welds to complete assembly in which a first welding sequence can be used for the first weld, a second welding sequence can be used for the second weld, and a third welding sequence can be used for the third weld. Moreover, in such example, the entire assembly of the workpiece including the three (3) welds can be referenced as a welding sequence. In an embodiment, a welding sequence that includes specific configurations or steps can further be included within a disparate welding sequence (e.g., nested welding sequence). A nested welding sequence can be a welding sequence that includes a welding sequence as part of the procedure. Moreover, the welding sequence can include at least one of a parameter, a welding schedule, a portion of a welding schedule, a step-by-step instruction, a portion of media (e.g., images, video, text, and the like), a tutorial, among others. In general, the welding sequence can be created and employed in order to guide an operator through welding procedure(s) for specific workpieces without the operator manually setting welding equipment to perform such welding procedures. The subject innovation relates to creating a welding sequence and/or modifying a welding sequence.

One or more welder power source(s) (e.g., welder power source 410) aggregates data respective to a respective welding process to which the welder power source is providing power to implement. Such collected data relates to each welder power source and is herein referred to as "weld data." Weld data can include welding parameters and/or information specific to the particular welding process the welder power source is supplying power. For instance, weld data can be an output (e.g., a waveform, a signature, a voltage, a current, among others), a weld time, a power consumption, a welding parameter for a welding process, a welder power source output for the welding process, and the like. In an embodiment, weld data can be utilized with welding job sequencer component 302. For example, weld data can be set by a welding sequence. In another example, weld data can be used as a feedback or a feedforward loop to verify settings.

In one embodiment, welding job sequencer component 302 is a computer operable to execute the disclosed methodologies and processes, including methods 1100 and 1200 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with welding job sequencer 302.

Welding job sequencer 302 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within welding job sequencer 302, such as during start-up, is stored in the ROM.

Welding job sequencer 302 can further include a hard disk drive, a magnetic disk drive, e.g., to read from or write to a removable disk, and an optical disk drive, e.g., for reading a CD-ROM disk or to read from or write to other optical media. Welding job sequencer 302 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by welding job sequencer 302.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in welding job sequencer 302 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 415), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or in combination with display 415) can be employed with welding job sequencer 302 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from welding job sequencer 302 via any wireless or hard wire protocol and/or standard. In another example, welding job sequencer 302 and/or system 400 can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

Figure 5:
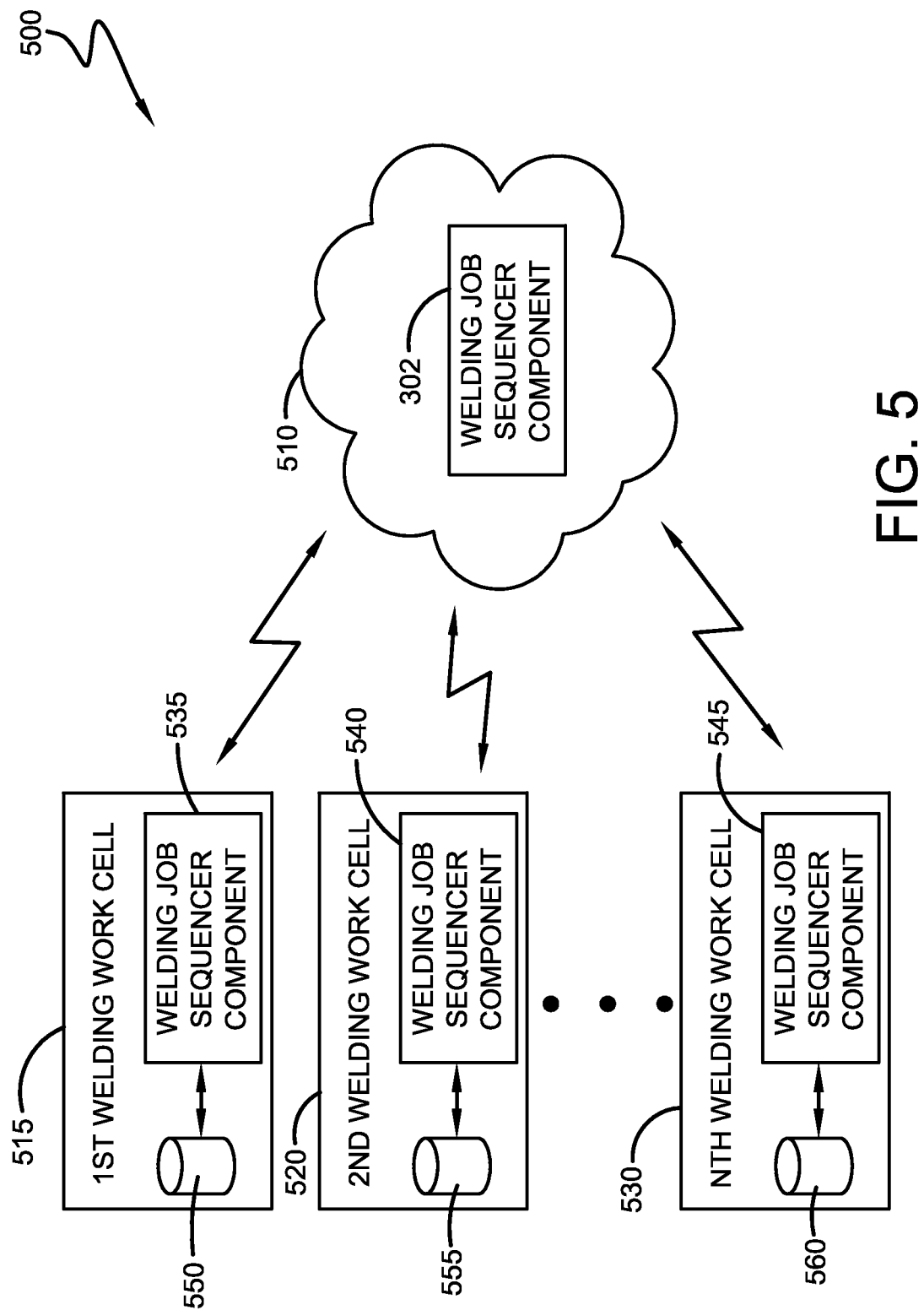
FIG. 5 is a block diagram illustrating a distributed welding environment with a plurality of welding work cells that interface with a welding job sequencer component via a local, remote, or cloud database.

Turning to FIG. 5, system 500 illustrates a welding environment with a plurality of welding work cells via a local, remote, or cloud database. System 500 includes a plurality of welding work cells such as first welding work cell 515, second welding work cell 520 to Nth welding work cell 530, where N is a positive integer. In an embodiment, each welding work cell includes a welding job sequencer component 535, 540, and 545, that is used to implement a welding schedule(s) to each welding work cell as well as or in the alternative to an enterprise-wide welding operation(s) and/or enterprise-wide welding work cell. Welding sequence(s) from each welding job sequencer component 535, 540, and 545 is received from the local or cloud database (e.g., local database, cloud database, remote database, among others) computing platform 510.

In an embodiment, each welding work cell further includes a local data store. For instance, first welding work cell 515 includes welding job sequencer component 535 and data store 550, second welding work cell 520 includes welding job sequencer component 540 and data store 555, and Nth welding work cell 530 includes welding job sequencer component 545 and data store 560. It is to be appreciated that system 500 includes welding job sequencer 302 hosted by computing platform 510 in which each welding work cell includes a distributed and respective welding job sequencer component. Yet, it is to be understood that welding job sequencer 302 (and distributed welding job sequencer components 535, 540, and 545) can be a stand-alone component in each welding work cell or a stand-alone component in the computing platform 510.

Each welding work cell can include a respective data store that stores a portion of at least one welding sequence. For instance, welding sequences related to a welding process A is employed at one or more welding work cell. The welding sequence is stored in a respective local data store (e.g., data stores 550, 555, and 560). Yet, it is to be appreciated and understood that each welding work cell can include a local data store (as depicted), a collective and shared remote data store, a collective and shared local data store, a cloud data store hosted by computing platform 510, or a combination thereof. A "data store" or "memory" can be, for example, either volatile memory or nonvolatile memory, or can include both volatile and nonvolatile memory. The data store of the subject systems and methods is intended to comprise, without being limited to, these and other suitable types of memory. In addition, the data store can be a server, a database, a hard drive, a flash drive, an external hard drive, a portable hard drive, a cloud-based storage, and the like.

For instance, welding job sequencer component 302 can manage each welding job sequencer component 535, 540, 545 in each welding work cell 515, 520, 530. In another embodiment, the communications can be transmitted from the welding job sequencer 302 to each welding work cell (e.g., each welding job sequencer component). In another embodiment, the communications can be received from each welding work cell (e.g., each welding job sequencer component) from the welding job sequencer component 302. For instance, a welding sequence can be used with $1^{st}$ welding work cell 515 and communicated directly to a disparate welding work cell or via computing platform 510.

Figure 6:
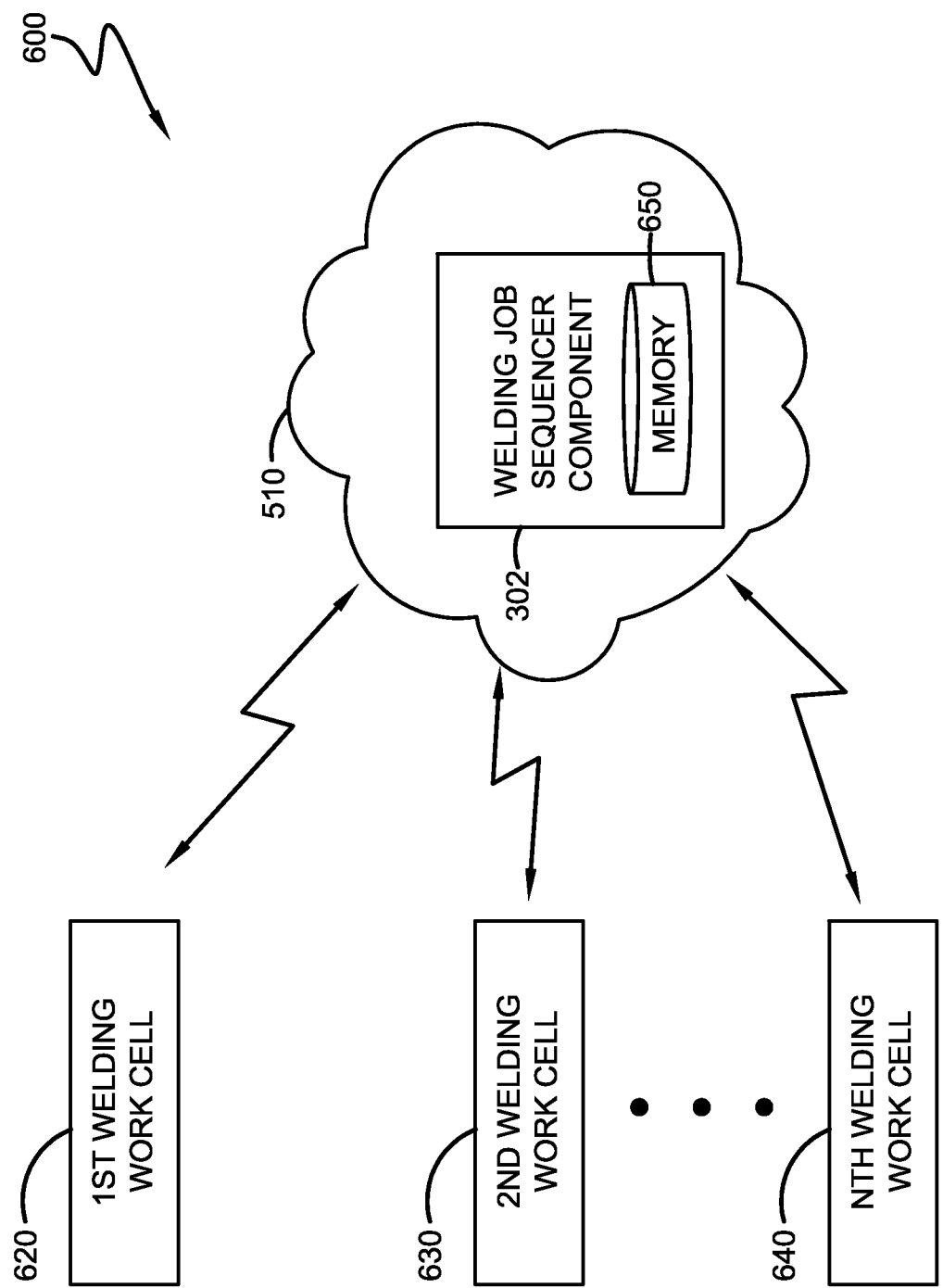
FIG. 6 is a block diagram illustrating a welding system that includes a plurality of welding work cells in which welding work cells are managed by a cloud-based welding job sequencer component.

FIG. 6 illustrates welding system 600 that includes a plurality of welding work cells in which welding job sequencer component 302 is hosted with computing platform 510 to utilize one or more welding sequences to configure welding equipment within one or more welding systems, welding environments, and/or welding work cells. Welding system 600 includes a local or cloud-based welding job sequencer component 302 hosted in computing platform 510. Welding job sequencer component 302 can utilize a welding sequence with a number of welding work cell. For instance, welding system 600 can a number of welding work cells such as, but not limited to, $1^{st}$ welding work cell 620, $2^{nd}$ welding work cell 630, to Nth welding work cell, where N is a positive integer. It is to be appreciated that the locality of the welding job sequencer component 302 is in relation to each $1^{st}$ welding work cell 620, $2^{nd}$ welding work cell 630, and/or Nth welding work cell 640.

In an embodiment, welding job sequencer 302 communicates one or more welding sequence to a target welding work cell, wherein the target welding work cell is a welding work cell that is to utilize the communicated welding sequence. Yet, in another embodiment, welding job sequencer 302 utilizes memory 650 hosted by computing platform 510 in which one or more welding sequences are stored. Yet, the stored welding sequence can be related or targeted to one or more welding work cells regardless of a storage location (e.g., local, cloud, remote, among others).

Figure 7:
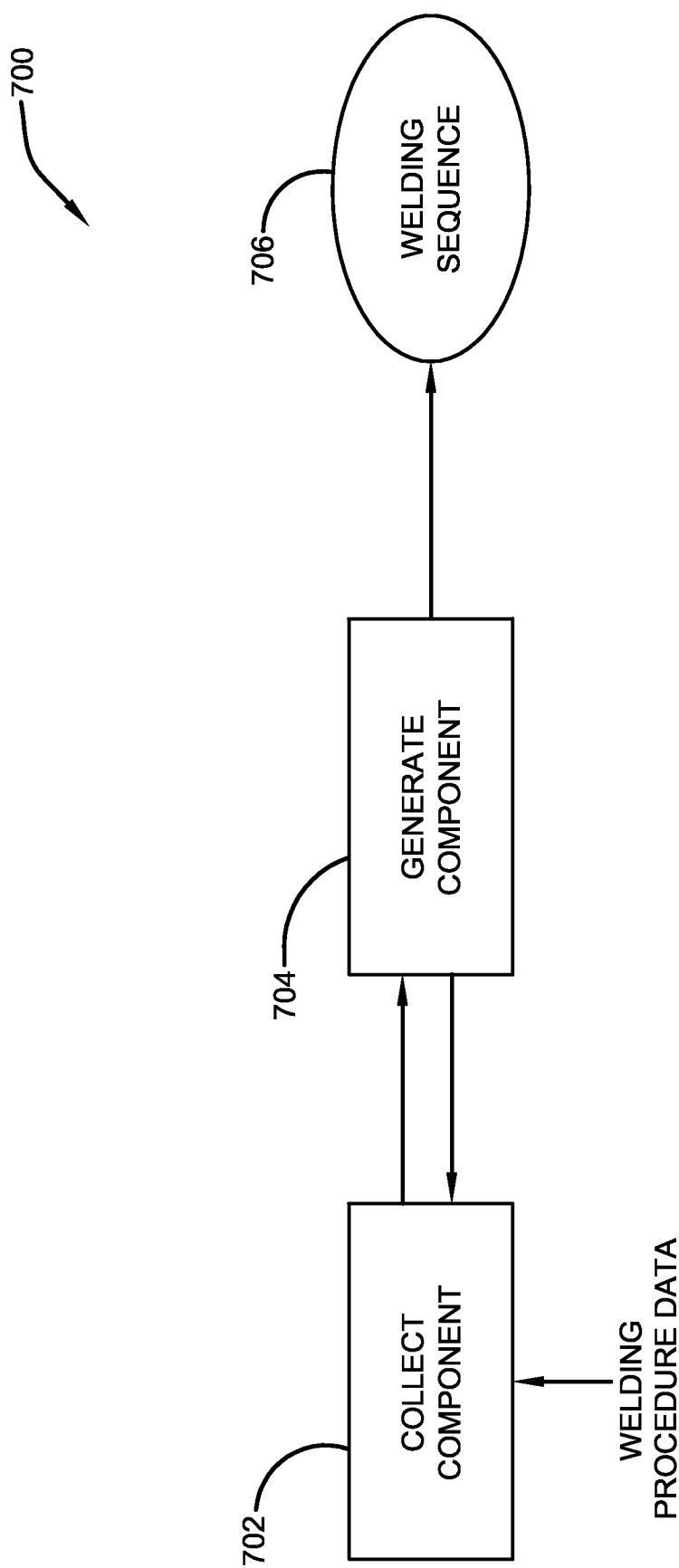
FIG. 7 is a block diagram illustrating a system that generates a welding sequence based on welding procedure data.

FIG. 7 illustrates system 700 that generates a welding sequence based on welding procedure data. System 700 includes collect component 702 that is configured to receive a portion of welding procedure data to create welding sequence 706. Collect component 702 receives, collects, aggregates, and/or identifies a portion of welding procedure data in which generate component 704 utilizes to create welding sequence 706. As discussed above, welding sequence 706 is used by a welding job sequencer component (See FIGS. 3-6) to perform two or more welds with two or more respective welding parameters (e.g., welding schedules, parameters, configurations, settings, and the like). In particular, welding sequence 706 is employed to automatically configure welding equipment without operator intervention to perform a first welding operation with a first welding schedule and a second welding operation with a second welding schedule.

The portion of welding procedure data is related to at least one of a performed welding process or procedure, or a welding process or procedure that has been performed. For instance, a portion of welding procedure data is data based upon a real world welding operation (e.g., real time weld being performed and data collected therefrom, previously collected data from a weld performed, among others). By way of example and not limitation, welding procedure data can be at least one of welding parameters, settings (e.g., voltage, current, and the like), monitored readings (e.g., measured current, measure voltage, and the like), welding equipment configurations (e.g., power source settings, waveforms, wire feed speed, and the like), welder setup (e.g., workpiece type, wire type, material type, weld to perform, and the like), among others. In general, welding procedure data can be any data collected or monitored from a weld or welding equipment during the actual weld being performed or created.

Although system 700 is illustrated as a stand-alone system, it is to be appreciated that system 700 can be a stand-alone system (as depicted), incorporated into welding job sequencer component (not shown), or a combination thereof. Further, welding procedure data can be received via welding job sequencer and thus from a local data store, a remote data store, a cloud-based data store, a computing platform, and/or any other network or computing environment configuration discussed above in regards to the welding job sequencer. For instance, a welding environment A can collect welding procedure data or parameters in which such welding procedure data is communicated (e.g., via Internet, cloud, computing platform, among others) to welding environment B. Welding environment B can utilize the welding procedure data from environment A to create a welding sequence for welding environment B based on a correlation or matched parameter for the welding procedure to perform.

In an embodiment, real world weld data or real world welding procedure data can be utilized by generate component 704 to create welding sequence 706 independent of a welding environment to which welding procedure data originates. For instance, welding procedure data can be collected from one or more welding operations, welding equipment, welding environments, welding work cells, and the like. Based on the collected welding procedure data, generate component 704 can further be configured to identify one or more parameters to use as welding sequence 706. In an embodiment, a computer-based evaluation can be utilized to determine which collected welding procedure data provides desired results. In another embodiment, an operator or user can evaluate collected welding procedure data to select which welding procedure data provides a desired result. As discussed above, a cloud-based platform or computing platform can be employed to collect welding procedure data used to generate welding sequence(s) 706.

In an example, a welding sequence can include a replenishment of a consumable. The welding sequence can be created or edited to include a replenishment of a consumable for at least one of a welding work cell, a welding equipment, among others. For instance, a replenishment of a consumable can be included with a welding sequence after a period of time, wherein the period of time is estimated based on the duration the welding equipment is used (e.g., estimate the use of consumables). Thus, a welding environment, welding system, and/or welding work cell can be evaluated in real time or from collected real time data and identify data to determine a replenishment of a consumable. In another example, a welding sequence can include an inspection or a repair. The welding sequence can be created or edited to include an inspection request or a repair request based on a factor such as, but not limited to, a time, a duration, among others. A welding work cell can have a maintenance period for a particular time and if a welding sequence is created for such welding work cell, a repair or maintenance can be included with the created welding sequence. Thus, a welding environment, welding system, and/or welding work cell can be evaluated in real time or from collected real time data and identify data to determine inspections or repairs.

Furthermore, it is to be appreciated and understood that collect component 702 can be a stand-alone component (as depicted), incorporated into generate component 704, incorporated into the welding job sequencer component (not shown), or a combination thereof. Additionally, generate component 704 can be a stand-alone component (as depicted), incorporated into collect component 702, incorporated into the welding job sequencer component (not shown), or a combination thereof.

Figure 8:
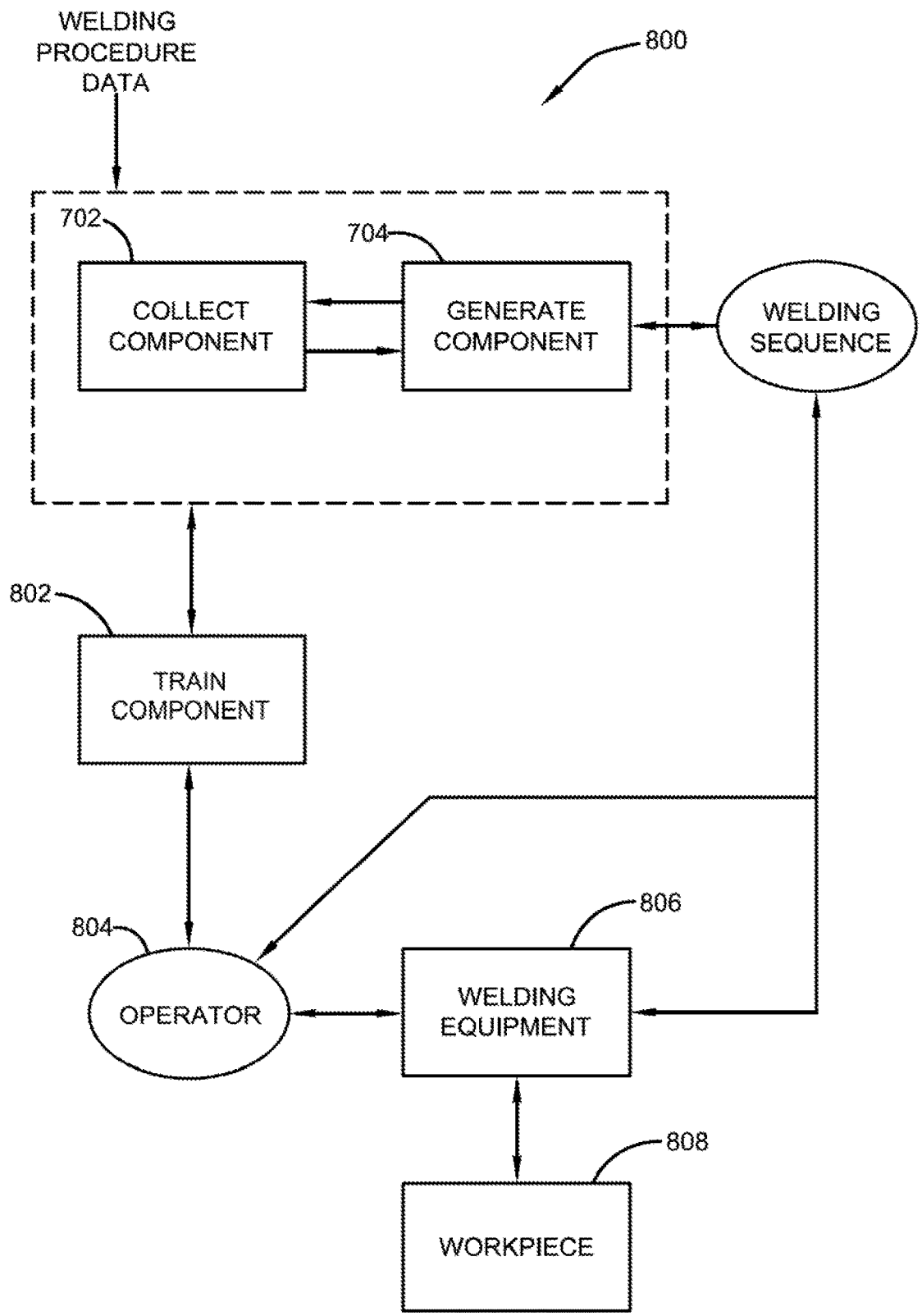
FIG. 8 is a block diagram illustrating a system that creates a welding sequence from an operator performing a weld with welding equipment on a workpiece.

FIG. 8 illustrates system 800 that creates a welding sequence from an operator performing a weld with welding equipment on a workpiece. System 800 further includes train component 802 that is configured to receive a live feed (e.g., real time capture) of a welding procedure and/or creation of a weld. Train component 802 enables operator 804 to input welding procedure data to create a welding sequence in which the input is the operator physically performing the weld and/or welding procedure from which to create a welding sequence. By way of example and not limitation, train component 802 allows operator 804 to perform a weld (e.g., create the weld with welding equipment 806 on workpiece 808) rather than providing welding procedure data. It is to be appreciated that system 800 and/or train component 802 can create a welding sequence based upon at least one of welding procedure data, physically performed weld creation (via train component 802), or a combination thereof.

The training for a welding sequence can be based on an operator or a machine performed weld or welding procedure. The monitoring of the operator or the machine performed weld or welding procedure can be recorded with, for instance, a video camera, a camera, a data collector (e.g., collecting settings, voltage, current, materials used, welding equipment settings, and the like), among others. For instance, an embodiment can include a snapshot of settings for welding equipment 806 to base a creation of a welding sequence. With the settings of welding equipment 806 established, the welding sequence can be utilized to automatically configure one or more welding equipment 806 to perform two or more welds without user intervention.

Train component 802 is further configured to record data related to a welding procedure from which a welding sequence is to be created or originate. For instance, welding characteristics (e.g., voltage, current, wire feed speed, settings for welding equipment, among others) can be collected related to the welding operation being performed. Additionally or in the alternative, data related to the act of performing the welding procedure can be captured as well. As will be discussed in more detail below, data related to the act of performing the welding procedure can include media (e.g., video, images, audio, among others) of the operator and/or machine performing the welding procedure.

In an embodiment, a user can perform a physical weld and approve or reject whether the physical weld performed (and welding procedure data related thereto) is to be used by generate component 704 to create the welding sequence. If approved, the data collected from the real time physical weld via train component 802 is used to create the welding sequence. If rejected, the data collected is not used to create a welding sequence. In another embodiment, an average of data collected during training can be employed. For instance, train component 802 can monitor, track, and/or collect real time data during physical training of weld creation for a specified number of welds. During such training, an average of the collected or tracked data can be used to create settings or configurations used with a created welding sequence. Thus, monitoring or tracking more than one physical creation of a weld or welding process can provide more accurate data to be used to generate a welding sequence.

In another embodiment, welds and/or welding procedures can be stored in a data store (discussed in more detail below). With a data store of weld and/or welding procedures, characteristics (e.g., weld type, material, workpiece, type of welding equipment, wire feed speed, wire gauge, time, pace, among others) can be identified from which individual characteristics can be aggregated to create one or more welding sequences. In other words, individual weld data (welding procedure data for a single weld) can be collected for a particular welding sequence (already created or being used) from which a best individual weld data tracked can replace existing data with the welding sequence (e.g., based upon performance analysis, among others).

Figure 9:
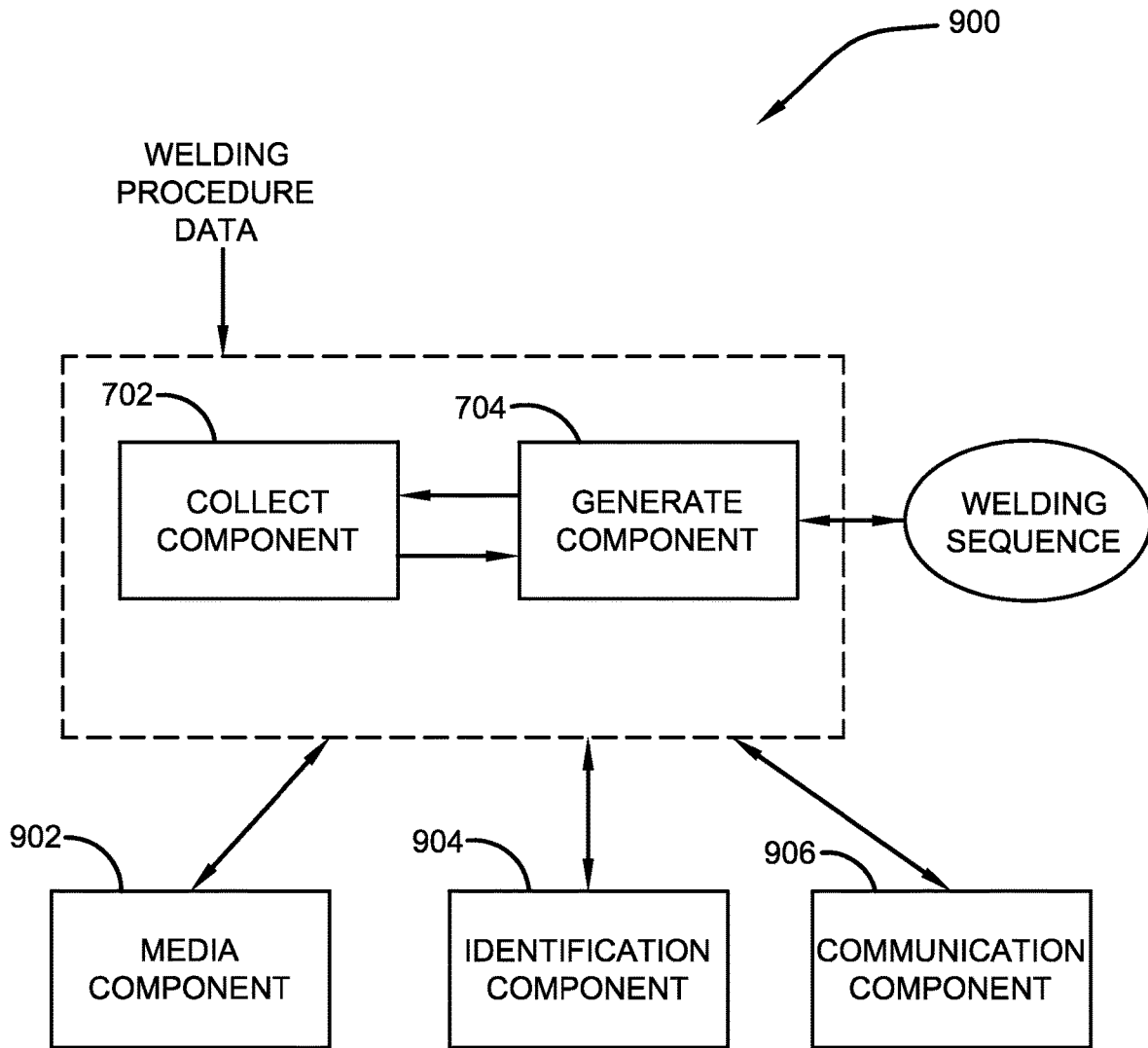
FIG. 9 is a block diagram illustrating a system that creates a welding sequence for employment in a welding environment.

FIG. 9 illustrates system 900 that creates a welding sequence for employment in a welding environment. System 900 includes media component 902 that is configured to include media to a welding sequence. It is to be appreciated that media can be, but is not limited to being, photos, images, graphics, text, audio, video, computer generated imagery, animations, dictations, voice recordings, and the like. For example, media component 902 includes media to facilitate performing a weld or welding operation from an operator perspective. In an embodiment, media component 902 includes a video of a weld being created (e.g., via train component above) for the welding sequence. Thus, when the welding sequence is used to create a weld, the video can guide an operator on how to perform the weld. In another example, media component 902 provides media related to at least one of safety concerns for utilizing the welding procedure, areas of caution, problematic situations, warnings, potential mistakes, scores, time, date, ranking of welding performed, among others. Media component 902 includes data with the welding sequence that can be displayed, communicated, or output to the operator, a location where the welding sequence is used, within a welding work cell, a welding environment, and the like.

System 900 further includes identification component 904 that is configured to aggregate data for specification of the created welding sequence. Identification component 904 associates data to a welding sequence during or after creation, wherein the data can specify such welding sequence. By way of example and not limitation, the data can relate to date, time, user identification of who created, user identification of who modified, welding job, client, workpiece information, welding information (e.g., welding parameters, welding equipment settings, and the like), environment data (e.g., welding environment that welding sequence will be used, target welding equipment, and the like), job information (e.g., work order, client, work instructions, and the like), among others. Identification component 904 is customizable to include data to locate and employ a welding sequence via search and/or query based on a criteria defined or included with a welding sequence. In an embodiment, a job-based criteria can be employed in which job related data is aggregated for a created welding sequence and associated therewith. Thus, after creation of the welding sequence, a query (discussed in more detail below) with job-based data can be utilized to locate and find the welding sequence. It is to be appreciated that various data can be collected and associated with a created welding sequence at various points of creation and that any suitable data can be collected at any suitable point during the creation of a welding sequence.

For instance, identification component 904 can collect an employee identification of a creator of a welding sequence. By way of example and not limitation, the employee identification can be related to a creator of the welding sequence, an actor of performing a welding procedure (e.g., via train component discussed above), an editor of a welding sequence, among others. It is to be appreciated that identification component 904 can associate one or more employee identifications to a welding sequence to provide a tracking of each welding sequence creation, edit, and/or modification of a welding sequence. This employee identification information can be used to provide query results for one or more creators (e.g., employees, workers, users, and the like).

Moreover, it is to be appreciated and understood that identification component 904 can collect data for a portion of a welding sequence to enable portions or parts of a welding sequence to be identified or located. This, for instance, can allow a user to identify a part or portion of a welding sequence to reuse in a creation of another welding sequence.

System 900 further includes communication component 906 that is configured to transmit and/or receive at least a portion of a welding sequence. In an embodiment, communication component 906 can transmit a portion of a welding sequence from a first location to a second location. For example, a welding sequence can be communicated from a welding work cell to a disparate welding work cell, a welding environment to a disparate welding environment, an operator to a disparate operator, among others. In an embodiment, communication component 906 is further configured to print data related to the welding sequence, wherein the data is at least one of work instructions, related media, client information, welding parameters, welding equipment settings, details of the welding sequence, among others.

Figure 10:
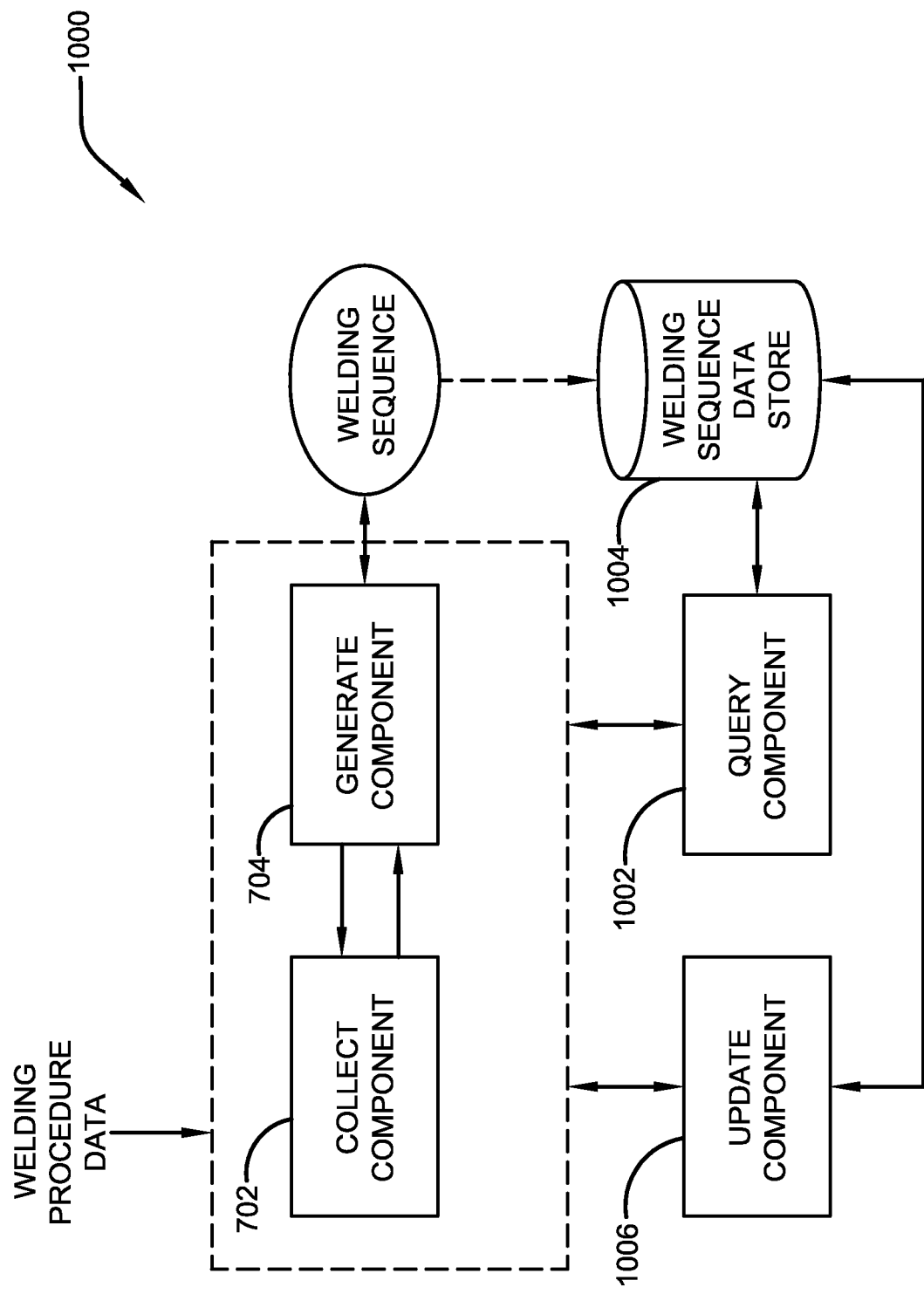
FIG. 10 is a block diagram illustrating a system that utilizes a welding sequence for automatic configuration of a welding system to perform two or more welds.

FIG. 10 illustrates system 1000 that utilizes a welding sequence for automatic configuration of a welding system to perform two or more welds. System 1000 includes query component 1002 that is configured to receive a query and provide a result based on the query. Query component 1002 can query one or more data stores discussed above. In particular, query component 1002 can query data stored with welding sequence data store 1004. Welding sequence data store 1004 stores at least one of a welding sequence, a portion of a welding sequence, and/or data (e.g., metadata, metadata tags, and the like) associated with a welding sequence. Query component 1002, based on a received query, can generate results from at least welding sequence data store 1004. Query component 1002 and welding sequence data store 1004 facilitate creating welding sequences (e.g., by allowing reuse of portions of a welding sequence), management of welding sequences, and locating welding sequences (e.g., updating, synchronizing, consistency, among others). As discussed above, query component 1002 can leverage data collected via identification component (See FIG. 9).

In an embodiment, query component 1002 is further configured to match a welding sequence based on a received query or data. For instance, a query requesting a welding sequence related to a particular parameter can be received by query component 1002 in which a welding sequence matching or including the particular parameter is returned. In a more particular example, a welding procedure can be monitored in real time to collect real time parameters (e.g., welding procedure data) and the query component 1002 can identify a welding sequence that matches or includes a portion of the welding procedure data. Utilizing the matched welding sequence, welding equipment and/or operator(s) can be guided through the previously monitored welding procedure. For instance, a well-experienced operator can be monitored and subsequently (after the welding procedure is created or matched) a less experienced operator and/or equipment can be guided and/or configured.

System 1000 further includes update component 1006 that is configured to modify a previously created welding sequence. Update component 1006 modifies an existing welding sequence with new (e.g., non-existing data) or edited (e.g., previously existing data) information. It is to be appreciated that update component 1006 can create a new welding sequence that includes modified data and archive the previous welding sequence. In another embodiment, update component 1006 can replace the new welding sequence with modified data in place of the previous welding sequence. Moreover, it is to be appreciated that update component 1006 can be utilized with query component 1002, welding sequence data store 1004, and/or identification component (See FIG. 9).

For instance, a user can utilize query component 1002 to identify a previously created welding sequence in order to update the welding sequence with an updated media. Once identified via query component 1002 in welding sequence data store 1004 with identification component, the user or operator can add or replace media with the welding sequence to provide up-to-date specifications.

In an embodiment, upon completion of a created welding procedure, a data model and/or software model can be employed to manage factors of the welding procedure used for the welding procedure. The software model and/or data model evaluates welding procedures performed with a corresponding welding sequence from which factors can be adjusted. For instance, a cycle time and/or a progression for a welding procedure can be adjusted based upon at least one of a software model and/or a data model.

Figure 11:
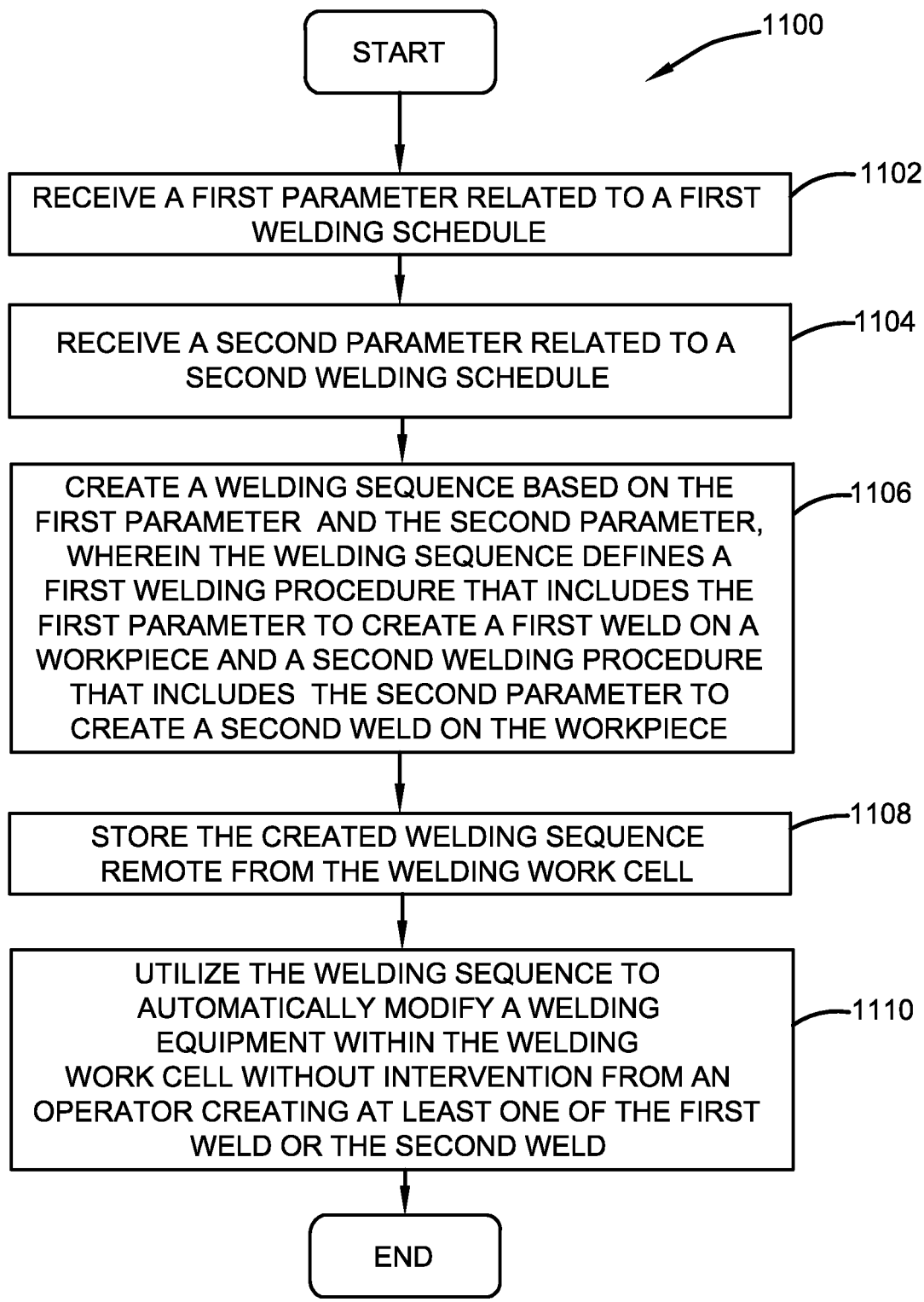
FIG. 11 is a flow diagram of creating a welding sequence for employment to automatically configure welding equipment within a welding work cell.
Figure 12:
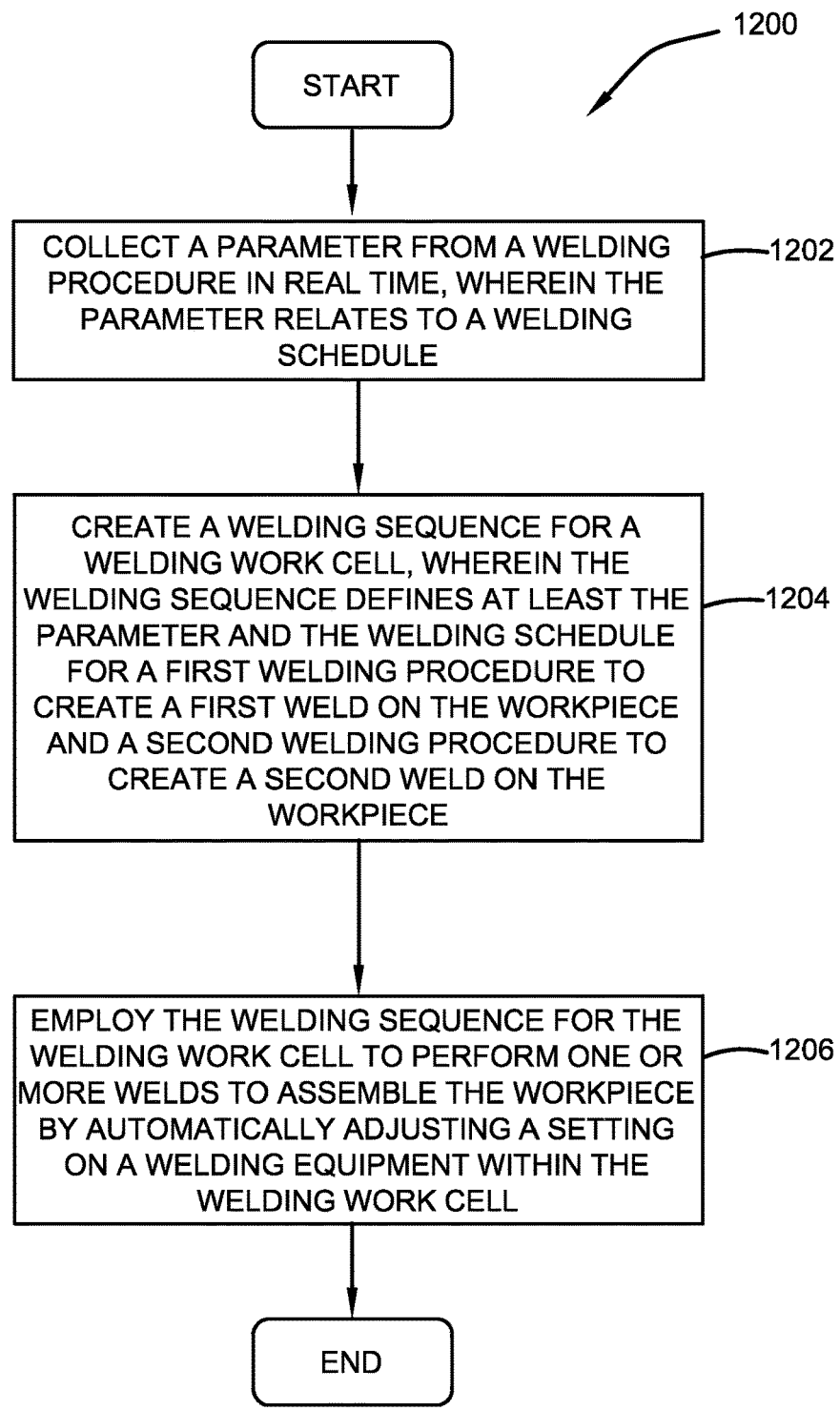
FIG. 12 is a flow diagram of creating a welding sequence based on one or more parameters of a welding procedure being performed or that has been performed.

In view of the exemplary devices and elements described supra, methodologies that may be implemented in accordance with the disclosed subject matter will be better appreciated with reference to the flow charts and/or methodologies of FIGS. 11 and 12. The methodologies and/or flow diagrams are shown and described as a series of blocks, the claimed subject matter is not limited by the order of the blocks, as some blocks may occur in different orders and/or concurrently with other blocks from what is depicted and described herein. In an embodiment, a first input can be received prior to a second input (as described below). In another embodiment, a second input can be received prior to a first input. In an embodiment, the first input and a second input can be received at substantially the same time. Moreover, not all illustrated blocks may be required to implement the methods and/or flow diagrams described hereinafter.

Sequentially, the following occurs as illustrated in the decision tree flow diagram 1100 of FIG. 11 which is a flow diagram 1100 that creates a welding sequence for employment to automatically configure welding equipment within a welding work cell. Methodology 1100 evaluates one or more parameters related to a welding procedure being performed or that has been performed. A first parameter is received in which the first parameter is related to a first welding schedule (reference block 1102). A second parameter is received in which the second parameter is related to a second welding schedule (reference block 1104). It is to be appreciated that the first parameter and/or the second parameter can be based upon at least one of a previously performed welding precedure or a welding procedure being performed (e.g., real time). A welding sequence is created based on the first parameter and the second parameter, wherein the welding sequence defines a first welding procedure that includes the first parameter to create a first weld on a workpiece and a second welding procedure that includes the second parameter to create a second weld on the workpiece (reference block 1106). The created welding sequence is stored remote from the welding work cell (reference block 1108). For instance, the welding sequence is stored on a disparate network than a network that hosts a portion of the welding work cell. In another embodiment, the welding sequence can be stored locally in reference to the welding work cell (e.g., welding sequence stored on a same network as the welding work cell). The welding sequence is utilized to automatically modify a welding equipment within the welding work cell without intervention from an operator creating at least one of the first weld or the second weld (reference block 1110).

The following occurs as illustrated in the flow diagram 1200 of FIG. 12. Flow diagram 1200 relates to creating a welding sequence based on one or more parameters of a welding procedure being performed or that has been performed. A parameter is collected from a welding procedure in real time, wherein the parameter relates to a welding schedule (reference block 1202). A welding sequence is created for a welding work cell, wherein the welding sequence defines at least the parameter and the welding schedule for a first welding procedure to create a first weld on a workpiece and a second welding procedure to create a second weld on the workpiece (reference block 1204). The welding sequence is employed for the welding work cell to perform one or more welds to assemble the workpiece by automatically adjusting a setting on a welding equipment within the welding work cell (reference block 1206).

By way of example and not limitation, welding equipment (e.g., controller for a welder power source, wire feeder, welder power source, among others) can include one or more steps related to a particular welding process for a specific workpiece, wherein a step can include a respective setting or configuration for at least one welding equipment. For instance, a first workpiece can include steps A, B, C, and D based on welding parameters desired, the welding process used, and/or the workpiece. In another example, a second workpiece can include steps B, C, A, E, and F. With the employment of a welding sequence, the controller implementing the steps for the welding process via the welder power source and/or welding equipment can be managed and/or instructed. For instance, the welding sequence can indicate at least one of the following: which steps to perform, redo a step, skip a step, pause a sequence of steps, among others. Furthermore, a controller (e.g., or other suitable component) can control one or more welder power sources, parameters, welding schedules, among others associated with one or more welding processes, wherein each welding process can have a corresponding welding sequence(s).

In an embodiment, the method can include modifying the created welding sequence to update at least a portion of the first welding schedule or the second welding schedule. The method can further include tracking a welding process in real time; collecting one or more parameters of the welding process in real time; and employing the one or more parameters collected as at least one of the first parameter or the second parameter. In an embodiment, the creating the welding process further includes: evaluating at least one of the first parameter or the second parameter in comparison with a previously created welding sequence; identifying a correlation between the first parameter and the second parameter with a portion of at least one previously created welding sequence; and utilizing a portion of the previously created welding sequence to create the welding sequence. In an embodiment, the method can include appending the welding sequence with media to aid in performing at least one of the first weld or the second weld, the media is at least one of a video or an image.

In an embodiment, a system can include a weld score component that is configured to evaluate at least one of the first weld or the second weld performed on the workpiece based upon at least one of an image of the first weld or the second weld or a user inspection. In an embodiment, a system can include a check point component that is configured to monitor the creation of at least one of the first weld or the second weld in real time. In an embodiment, the welding job sequencer component further instructs an operator of the welding work cell to assemble the workpiece with the first welding procedure and the second welding procedure having two separate welding schedules.

In an embodiment, a system can include a third component that is configured to receive real time data associated with a creation of a weld from an operator and to utilize the received real time data to create the welding sequence. In an embodiment, a system can include a data store that stores at least one of the parameter, the work schedule, or the welding sequence; and a fourth component that is configured to generate a query result based on a received query, wherein the query result is a welding sequence originating from a previously performed welding procedure from the data store that satisfies the received query. In an embodiment, a system can include a fifth component that is configured to append a portion of media to the welding sequence in which the media illustrates an instruction on performing the welding sequence on the workpiece.

In an embodiment, a system can include a sixth component that is configured to collect identification information for the welding sequence. In an embodiment, the identification information is metadata related to at least one of a user that created the welding sequence, a weld type, a client name, a material of the workpiece, a date, a time, a location, a serial number, a price, a wire speed, an originating welding procedure that is a source for the welding sequence, or a wire type. In an embodiment, the welding sequence includes a replenishment of a consumable based on real time data collected from the welding work cell to estimate a duration of time in which the replenishment is to be performed. In an embodiment, the welding sequence includes at least one of a repair or a maintenance of welding equipment based on real time data collected from the welding work cell to estimate a duration of time in which the repair or maintenance is to be performed.

In an embodiment, the step is at least one of an inspection, a maintenance for a welding equipment, a refilling of a consumable used in the welder system, a preventative maintenance for a welding equipment, a media capture of the workpiece, or a media capture of an assembly of the workpiece. In an embodiment, a system can include an seventh component that is configured to communicate a portion of the welding sequence. In an embodiment, the seventh component is further configured to generate a work instruction for the welding sequence based upon the welding schedule.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
   a processor; and
   a non-transitory computer readable medium storing instructions for the processor to execute, the instructions comprising:
   a generate component that is configured to automatically create or edit a welding sequence based on welding procedure data from a weld performed before employing the welding sequence;
   a welding job sequencer component that is configured to employ the welding sequence for a welding work cell to perform at least a first weld and a second weld, wherein the welding sequence defines at least:
   a first weld schedule having at least one first weld parameter; and
   a second weld schedule having at least one second weld parameter, wherein at least one of said second weld parameter is different from said first weld parameter; and
   the welder system configured to employ the welding sequence for the welding work cell to perform welds to assemble a workpiece by automatically adjusting parameters on a welding equipment within the welding work cell.

2. The welder system of claim 1, wherein the generate component is further configured to identify one or more parameters to use in the welding sequence based on the welding procedure data.

3. The welder system of claim 1, wherein the instructions further comprise a collect component that is configured to receive the welding procedure data in real time while the weld is performed.

4. The welder system of claim 1, wherein the generate component is further configured to automatically evaluate the welding procedure data to determine if the welding procedure data provides a desired result.

5. The welder system of claim 1, wherein a user verifies that the welding procedure data provides a desired result before at least one of the first weld parameter or the second weld parameter is included in the welding sequence.

6. The welder system of claim 1, wherein the welding procedure data is collected in a first welding environment and wherein the welding sequence is employed in a second welding environment different than the first welding environment.

7. The welder system of claim 1, wherein at least one of the first weld parameter or the second weld parameter is different than a parameter associated with the weld.

8. The welder system of claim 1, wherein the welding sequence further defines a system check function associated with at least one of the welds; and
wherein the generate component is further configured to automatically implement the system check function into the welding sequence based on the welding procedure data.

9. The welder system of claim 1, wherein at least one of the first weld schedule or the second weld schedule further comprises a weld instruction.

10. The welder system of claim 1, wherein the instructions further comprise a train component that is configured to capture at least a portion of the welding procedure data in real time.

11. The welder system of claim 10, wherein the captured welding procedure data comprises a snapshot of at least one of the welding equipment parameters.

12. The welder system of claim 10, wherein the captured welding procedure data comprises a recording of at least one of an operator or a machine performing a welding procedure.

13. The welder system of claim 12, wherein the recording includes at least one of a video, audio, or an image.

14. The welder system of claim 10, wherein an operator approves the captured welding procedure data before the captured welding procedure data is used to create or edit the welding sequence.

15. The welder system of claim 10, wherein an average of the captured welding procedure data is used to create or edit the welding sequence.

16. A method of welding with a welder system, comprising:
executing computer readable instructions; and
storing computer readable instructions, the instructions comprising:
automatically creating or editing a welding sequence for a welding work cell to perform at least a first weld and a second weld based on welding procedure data from a weld performed before employing the welding sequence, wherein the welding sequence defines at least:
a first weld schedule having at least one first weld parameter; and
a second weld schedule having at least one second weld parameter, wherein at least one of said second weld parameter is different from said first weld parameter; and
employing the welding sequence for the welding work cell to perform at least the first weld and the second weld by automatically adjusting a parameter on a welding equipment within the welding work cell.

17. A welder system, comprising:
means for executing computer readable instructions; and
means for storing computer readable instructions, the instructions comprising:
automatically creating or editing a welding sequence for a welding work cell to perform at least a first weld and a second weld based on welding procedure data from a weld performed before employing the welding sequence, wherein the welding sequence defines at least:
a first weld schedule having at least one first weld parameter; and
a second weld schedule having at least one second weld parameter, wherein at least one of said second weld parameter is different from said first weld parameter; and
the welder system configured to employ the welding sequence for the welding work cell to perform at least the first weld and the second weld by automatically adjusting a parameter on a welding equipment within the welding work cell.

18. The welder system of claim 8, wherein the system check function monitors a parameter associated with at least one of the welds to determine whether the welding sequence can continue; and
wherein the generate component is further configured to automatically define a measurable of the parameter associated with at least one of the welds that is indicative of a welding sequence stop point, and wherein the measurable is automatically defined based on the welding procedure data.

19. The welder system of claim 18, wherein the parameter comprises weld time and wherein the welding sequence stop point initiates a replenishment of a consumable.

20. The welder system of claim 18, wherein the parameter comprises weld time and wherein the welding sequence stop point initiates at least one of an inspection or a repair.

* * * * *